US007550529B2

(12) United States Patent
Drzal et al.

(10) Patent No.: US 7,550,529 B2
(45) Date of Patent: *Jun. 23, 2009

(54) EXPANDED GRAPHITE AND PRODUCTS PRODUCED THEREFROM

(75) Inventors: Lawrence T. Drzal, Okemos, MI (US); Hiroyuki Fukushima, Lansing, MI (US)

(73) Assignee: Board of Trustees of Michigan State University, East Lansing, MI (US)

( * ) Notice: Subject to any disclaimer, the term of this patent is extended or adjusted under 35 U.S.C. 154(b) by 114 days.

This patent is subject to a terminal disclaimer.

(21) Appl. No.: 11/363,336

(22) Filed: Feb. 27, 2006

(65) Prior Publication Data
US 2006/0148966 A1 Jul. 6, 2006

(51) Int. Cl.
| | |
|---|---|
| B28B 5/00 | (2006.01) |
| B27J 5/00 | (2006.01) |
| B29B 17/00 | (2006.01) |
| B29C 33/48 | (2006.01) |
| B29C 63/00 | (2006.01) |
| B29C 65/00 | (2006.01) |
| B29C 69/00 | (2006.01) |
| B29C 71/00 | (2006.01) |
| C01B 31/00 | (2006.01) |
| C01B 31/04 | (2006.01) |
| C04B 14/00 | (2006.01) |
| C04B 16/00 | (2006.01) |
| C08K 3/00 | (2006.01) |
| C08K 3/04 | (2006.01) |
| C08K 3/26 | (2006.01) |
| C04B 18/00 | (2006.01) |
| C04B 20/06 | (2006.01) |
| C04B 35/00 | (2006.01) |
| D04H 1/54 | (2006.01) |
| C08F 2/16 | (2006.01) |
| C08F 2/22 | (2006.01) |
| H01B 1/04 | (2006.01) |
| H01M 4/58 | (2006.01) |
| H01M 4/62 | (2006.01) |

(52) U.S. Cl. .................. 524/495; 252/378 R; 252/502; 264/45.2; 264/105; 264/126; 264/241; 264/347; 423/445 R; 423/448; 429/231.8; 429/232; 524/424; 524/496; 524/804

(58) Field of Classification Search .................. 524/424, 524/495, 496, 804; 252/378, 502, 378 R; 423/445, 448, 445 R; 264/45.2, 105, 126, 264/241, 347; 429/231.8, 232
See application file for complete search history.

(56) References Cited

U.S. PATENT DOCUMENTS

| | | | |
|---|---|---|---|
| 1,137,373 | A | 4/1915 | Alysworth |
| 1,191,383 | A | 7/1916 | Alysworth |
| 3,404,061 | A | 10/1968 | Shane et al. |
| 4,091,083 | A | 5/1978 | Hirschvogel et al. |
| 4,244,934 | A | 1/1981 | Kondo et al. |
| 4,530,949 | A | 7/1985 | Atkinson et al. |

(Continued)

Primary Examiner—Patrick D Niland
(74) Attorney, Agent, or Firm—Ian C. McLeod

(57) ABSTRACT

Graphite nanoplatelets of expanded graphite and composites and products produced therefrom are described. The preferred method of expanding the graphite is by microwaves or other radiofrequency wave treatment of intercalated graphite. The expanded graphite is preferably then crushed to nanometer (substantially all 200 microns or less). The expanded graphite is used in polymer composites. The expanded graphite is particularly useful for batteries, anodes and fuel cells.

7 Claims, 20 Drawing Sheets

Intercalated Natural graphite Flakes

U.S. PATENT DOCUMENTS

| | | |
|---|---|---|
| 4,704,231 A | 11/1987 | Chung |
| 4,888,242 A | 12/1989 | Matsuo et al. |
| 4,915,925 A | 4/1990 | Chung |
| 4,946,892 A | 8/1990 | Chung |
| 4,961,988 A | 10/1990 | Zhu |
| 4,987,175 A | 1/1991 | Bunnell, Sr. |
| 5,019,446 A | 5/1991 | Bunnell, Sr. |
| 5,149,518 A | 9/1992 | Mercuri et al. |
| 5,186,919 A | 2/1993 | Bunnell |
| 5,294,300 A | 3/1994 | Kusuyama |
| 5,330,680 A | 7/1994 | Sakawaki et al. |
| 5,344,726 A | 9/1994 | Tanaka et al. |
| 5,522,127 A | 6/1996 | Ozaki et al. |
| 5,582,781 A | 12/1996 | Hayward |
| 5,582,811 A | 12/1996 | Greinke et al. |
| 5,591,547 A | 1/1997 | Yoneda et al. |
| 5,672,446 A | 9/1997 | Barker et al. |
| 5,756,062 A | 5/1998 | Greinke et al. |
| 5,846,459 A | 12/1998 | Mercuri |
| 5,885,728 A | 3/1999 | Mercuri et al. |
| 5,981,072 A | 11/1999 | Mercuri et al. |
| 6,024,900 A * | 2/2000 | Saito et al. ................. 264/29.6 |
| 6,060,189 A | 5/2000 | Mercuri et al. |
| 6,136,474 A | 10/2000 | Kihira et al. |
| 6,143,218 A | 11/2000 | Mercuri |
| 6,149,972 A | 11/2000 | Greinke |
| 6,287,694 B1 | 9/2001 | Zaleski et al. |
| 6,306,264 B1 | 10/2001 | Kwon et al. |
| 2004/0217332 A1* | 11/2004 | Wagener et al. ............. 252/500 |

\* cited by examiner

FIG. 1 Intercalated Natural graphite Flakes
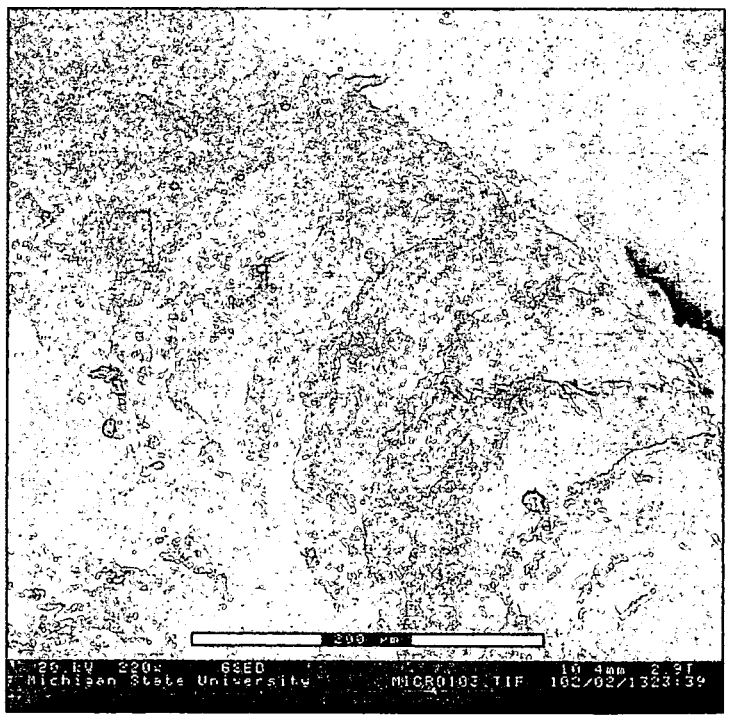
FIG. 2 Expanded Natural graphite Flakes by Microwave

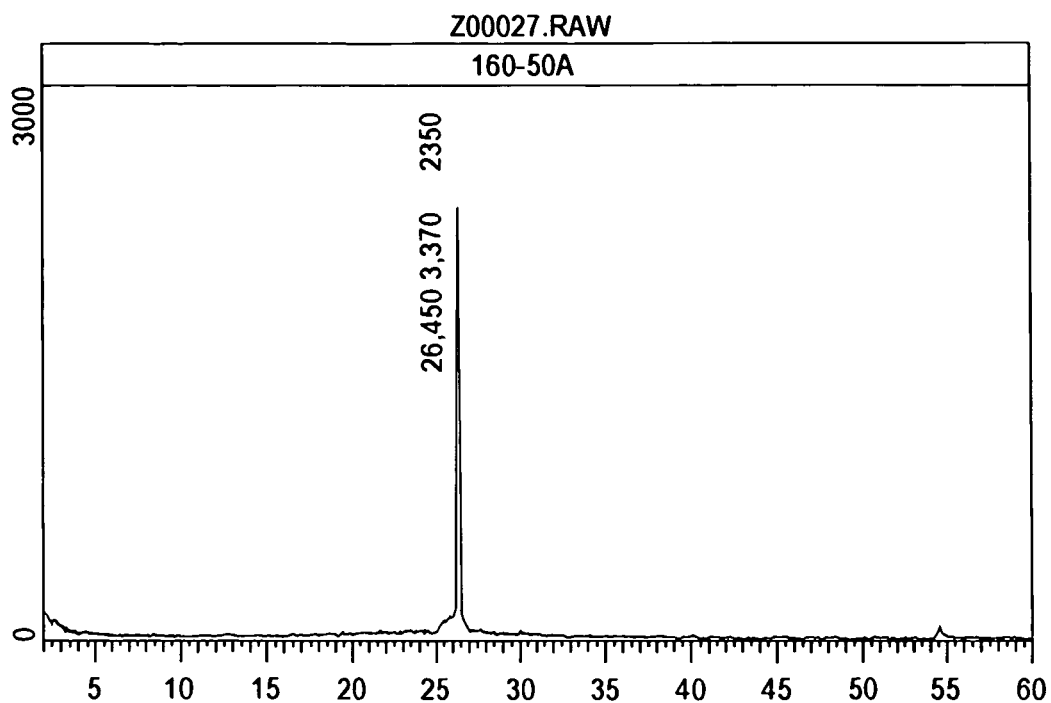
FIG. 3 X-Ray Diffraction Pattern of Intercalated Natural Graphite
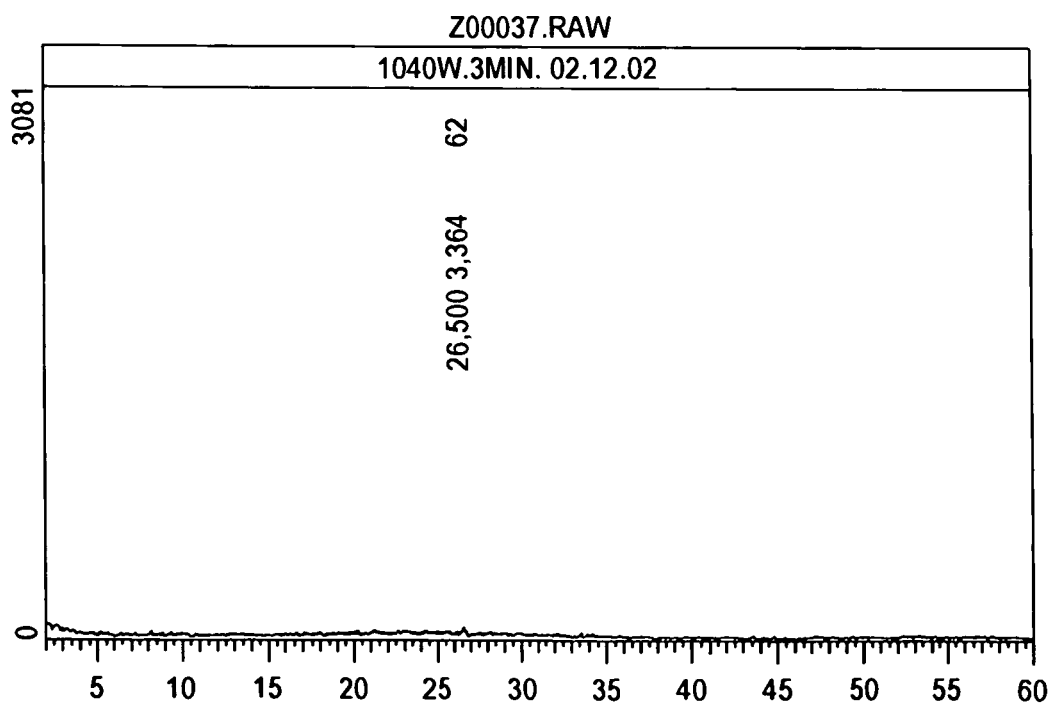
FIG. 4 X-Ray Diffraction Pattern of Intercalated Natural Graphite

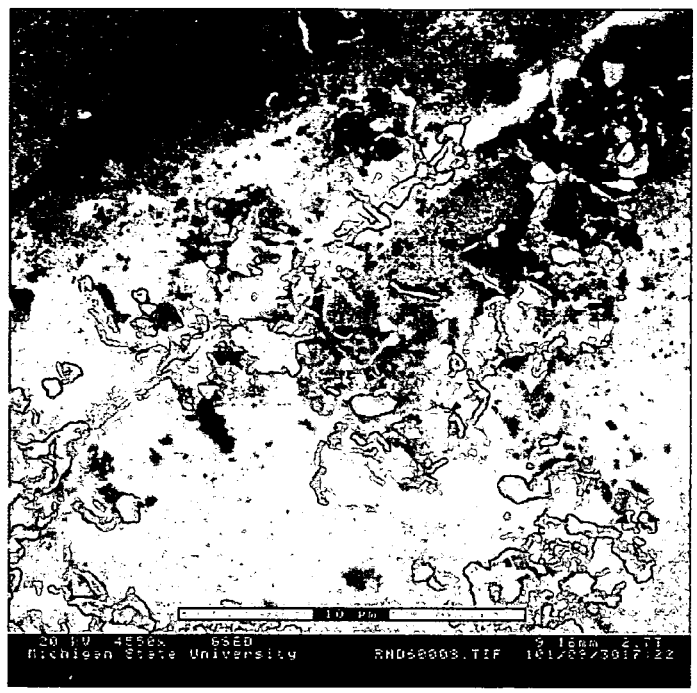
FIG. 5 Exfoliated Graphite Platelets
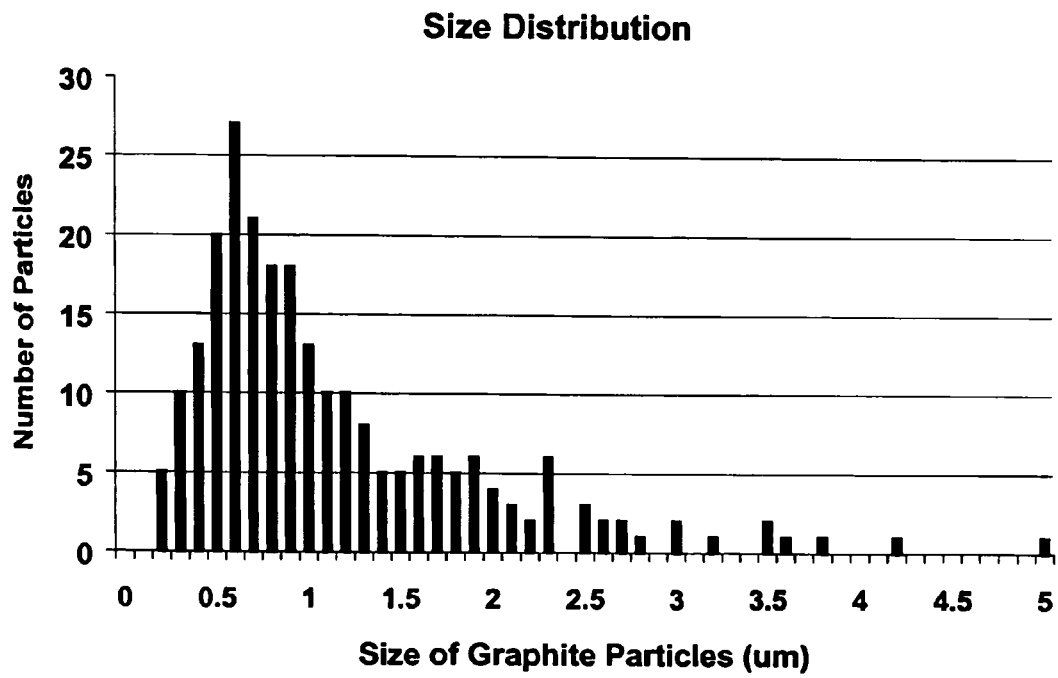
FIG. 6 Size Distribution of Exfoliated Graphite Platelets

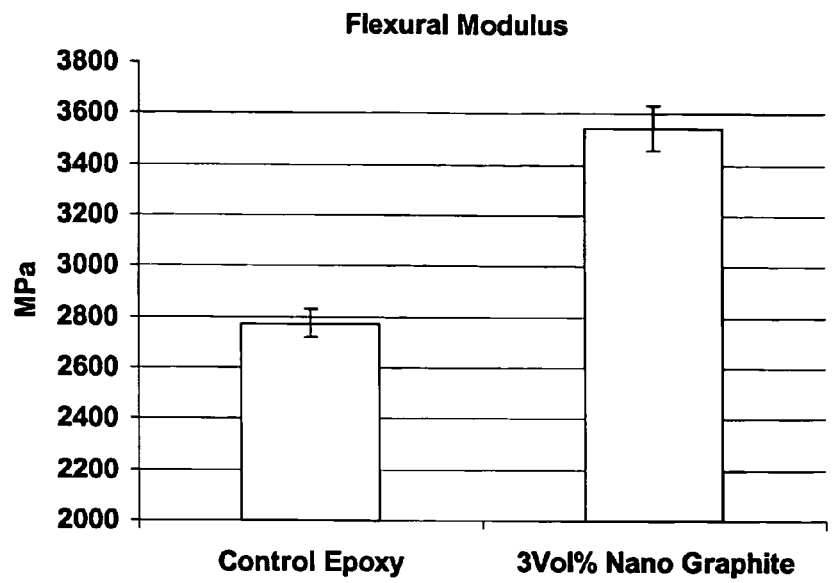
FIG. 7 Flexural Modulus of Control Epoxy and Graphite Nanoplatelets reinforced Composite
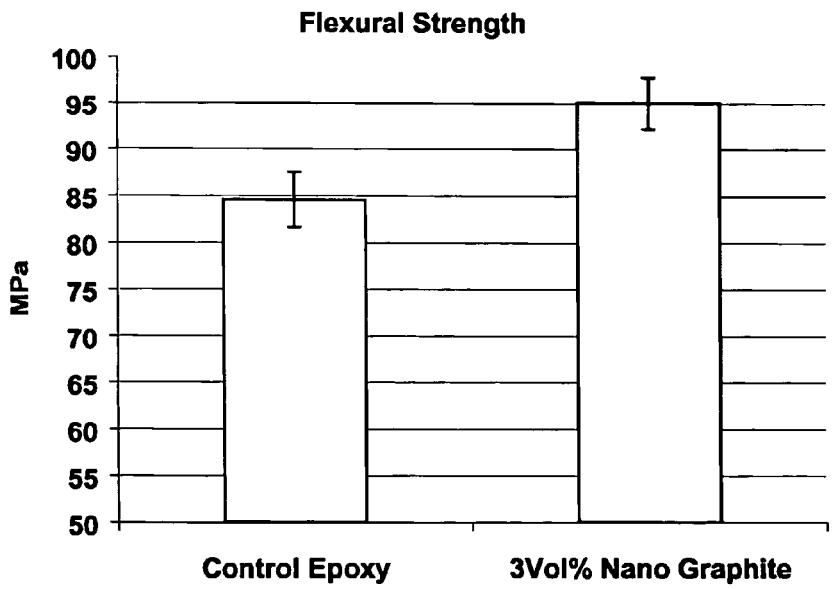
FIG. 8 Flexural Strength of Control Epoxy and Graphite Nanoplatelets reinforced Composite

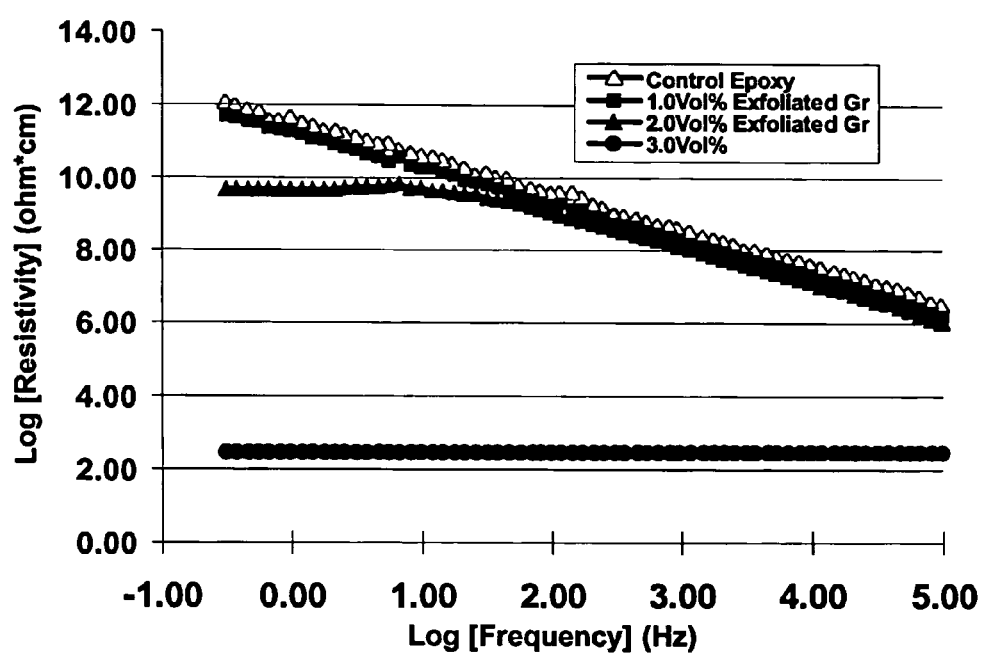
FIG. 9 Resistivity of Control Epoxy and Graphite Nanoplatelets reinforced Composites TEM Images of Graphite Nanoplatelets in Polymer Matrix (a) Effect of Acrylamide Grafting (b) Effect of Exfoliation Method and Milling (c) Comparison to Other Carbon Materials A: PAN based Carbon Fiber
(Scale Bar = 200um)

B: VGCF
(Scale Bar = 5um)

C: Carbon Black
(Scale Bar = 5um)

A: As-received Graphite
(Scale Bar=300 um)

B: Expanded Graphite
(Scale Bar=500 um)

C: Pulverized Graphite
(Scale Bar=5 um)

A: Scale Bar=50 nm

B: Scale Bar=2 nm

EXPANDED GRAPHITE AND PRODUCTS PRODUCED THEREFROM

CROSS-REFERENCE TO RELATED APPLICATION

This application claims priority to Provisional Application Ser. No. 60/410,263, filed Sep. 12, 2002.

STATEMENT REGARDING FEDERALLY SPONSORED RESEARCH OR DEVELOPMENT

Not applicable.

REFERENCE TO A "COMPUTER LISTING APPENDIX SUBMITTED ON A COMPACT DISC"

Not Applicable.

BACKGROUND OF THE INVENTION (1) Field of the Invention

Expanded graphite is provided in the present invention. The present invention relates in part to polymer-expanded graphite composites. The graphite platelets are preferably reduced in size to less than about 200 microns. The invention also relates to expanded graphite used for fuel cells, for battery anodes and for catalytic converters. The graphite is preferably expanded using microwave or radiofrequency wave heating.

(2) Description of Related Art

Graphite is a well known material occurring in natural and synthetic form and is well described in the literature. Illustrative of this art is a monograph by Michel A. Boucher, Canadian Minerals Yearbook 24.1-24.9(1994).

Nanocomposites composed of polymer matrices with reinforcements of less than 100 nm in size, are being considered for applications such as interior and exterior accessories for automobiles, structural components for portable electronic devices, and films for food packaging (Giannelis, E. P., Appl. Organometallic Chem., Vol. 12, pp. 675 (1998); and Pinnavaia, T. J. et al., Polymer Clay Nanocomposites. John Wiley & Sons, Chichester, England (2000)). While most nanocomposite research has focused on exfoliated clay platelets, the same nanoreinforcement concept can be applied to another layered material, graphite, to produce nanoplatelets and nanocomposites (Pan, Y. X., et al., J. Polym. Sci., Part B: Polym. Phy., Vol. 38, pp. 1626 (2000); and Chen, G. H., et al., J. Appl. Polym. Sci. Vol. 82, pp. 2506 (2001)). Graphite is the stiffest material found in nature (Young's Modulus=1060 MPa), having a modulus several times that of clay, but also with excellent electrical and thermal conductivity.

A useful form of graphite is expanded graphite which has been known for years. The first patents related to this topic appeared as early as 1910 (U.S. Pat. Nos. 1,137,373 and 1,191,383). Since then, numerous patents related to the methods and resulting expanded graphites have been issued. For example, many patents have been issued related to the expansion process (U.S. Pat. Nos. 4,915,925 and 6,149,972), expanded graphite-polymer composites (U.S. Pat. Nos. 4,530,949, 4,704,231, 4,946,892, 5,582,781, 4,091,083 and 5,846,459), flexible graphite sheet and its fabrication process by compressing expanded graphite (U.S. Pat. Nos. 3,404,061, 4,244,934, 4,888,242, 4,961,988, 5,149,518, 5,294,300, 5,582,811, 5,981,072 and 6,143,218), and flexible graphite sheet for fuel cell elements (U.S. Pat. Nos. 5,885,728 and 6,060,189). Also there are patents relating to grinding/pulverization methods for expanded graphite to produce fine graphite flakes (U.S. Pat. Nos. 6,287,694, 5,330,680 and 5,186,919). All of these patents use a heat treatment, typically in the range of 600° C. to 1200° C., as the expansion method for graphite. The heating by direct application of heat generally requires a significant amount of energy, especially in the case of large-scale production. RF or microwave expansion method can heat more material in less time at lower cost. U.S. Pat. No. 6,306,264 discusses microwave as one of the expansion methods for $SO_3$ intercalated graphite.

U.S. Pat. Nos. 5,019,446 and 4,987,175 describe graphite flake reinforced polymer composites and the fabrication method. These patents did not specify the methods to produce thin, small graphite flakes. The thickness (less than 100 nm) and aspect ratio (more than 100) of the graphite reinforcement was described.

Many patents have been issued related to anode materials for lithium-ion or lithium-polymer batteries (U.S. Pat. Nos. 5,344,726, 5,522,127, 5,591,547, 5,672,446, 5,756,062, and 6,136,474). Among these materials, one of the most widely investigated and used is graphite flakes with appropriate size, typically 2 to 50 μm, with less oxygen-containing functional groups at the edges. Most of the patents described graphite flakes made by carbonization of precursor material, such as petroleum coke or coal-tar pitch, followed by graphitization process.

SUMMARY OF THE INVENTION

An important aspect of utilizing graphite as a platelet nanoreinforcement is in the ability to expand this material. With surface treatment of the expanded graphite, its dispersion in a polymer matrix results in a composite with not only excellent mechanical properties but electrical properties as well, opening up many new structural applications as well as non-structural ones where electromagnetic shielding and high thermal conductivity are requirements. In addition, graphite nanoplatelets are ~500 times less expensive than carbon nanotubes.

Thus the present invention relates in part to a composite material which comprises:

(a) finely divided expanded graphite consisting essentially of single platelets which are less than 200 microns in length; and (b) a polymer having the expanded graphite platelets dispersed therein.

In particular, the present invention relates to a composite material which comprises:

(a) finely divided expanded graphite having single platelets with a length less than about 200 microns and a thickness of less than about 0.1 microns; and (b) a polymer having the expanded graphite particles dispersed therein, wherein the composite material contains up to 50% by volume of the graphite platelets. Preferably the expanded graphite platelets are present in an amount so that composite material is conductive.

A graphite precursor containing a chemical which was vaporized by heat to form the expanded graphite. In most cases, the chemical should be removed, preferably by heating, from the graphite by sufficient heating before mixing with polymers, since the chemical can degradate polymers. Preferably the expanded graphite has been formed in a radiofrequency wave applicator by heating the graphite precursor with the radiofrequency waves. Preferably a precursor graphite has been treated with a fuming oxy acid and heated to form the expanded graphite particles. Good results have been achieved with expanded graphite composites surface treated with acrylamide or other surface modifying treatments.

The invention applied to thermoset polymer systems, such as epoxy, polyurethane, polyurea, polysiloxane and alkyds, where polymer curing involves coupling or crosslinking reactions. The invention is applied as well to thermoplastic polymers for instance polyamides, proteins, polyesters, polyethers, polyurethanes, polysiloxanes, phenol-formaldehydes, urea-formaldehydes, melamine-formaldehydes, celluloses, polysulfides, polyacetals, polyethylene oxides, polycaprolactams, polycaprolactons, polylactides, polyimides, and polyolefins (vinyl-containing thermoplastics). Specifically included are polypropylene, nylon and polycarbonate. The polymer can be for instance an epoxy resin. The epoxy resin cures when heated. The epoxy composite material preferably contains less than about 8% by weight of the expanded graphite platelets. Thermoplastic polymers are widely used in many industries. The expanded graphite can also be incorporated into ceramics and metals.

Further the present invention relates to a method for preparing a shaped composite which comprises:

(a) providing a mixture of a finely divided expanded graphite consisting essentially of single platelets which are essentially less than 200 microns in length and with a polymer precursor with the expanded platelets dispersed therein; and (b) forming the shaped composite material from the mixture.

In particular, the present invention relates to a method for preparing a shaped composite material which comprises:

(a) providing a mixture of an expanded graphite having single platelets with a length less than about 200 microns and a thickness of less than about 0.1 microns with a polymer precursor with the expanded graphite platelets dispersed therein, wherein the composite material contains up to about 50% by volume of the expanded graphite platelets;

(b) forming the shaped composite material from the mixture.

Preferably the expanded graphite is provided in the polymer in an amount sufficient to render the shaped composite conductive. Preferably the expanded graphite has been expanded with expanding chemical which can be evaporated upon application of heat. Preferably the expanded graphite platelets are formed in a radiofrequency wave applicator by heating the graphite precursor with radiofrequency waves and then the expanding chemical is removed to form the graphite precursor. Preferably a graphite precursor is treated with a fuming oxy acid and heated to provide the expanded graphite particles.

The present invention also relates to an improvement in a battery containing ions in the anode which comprises a finely divided microwave or RF expanded graphite having single platelets with a length less than about 200 microns and a thickness of less than about 0.1 microns.

The present invention also relates to an improvement in a catalytic conversion of an organic compound to hydrogen with a catalytic material deposited on a substrate the improvement in the substrate which comprises a finely divided microwave or RF expanded graphite having single particles with a length less than about 200 microns and a thickness of less than about 0.1 microns.

Finally the present invention relates to a process for producing platelets of expanded graphite which comprises:

(a) expanding graphite intercalated with a chemical which expands upon heating to produce expanded graphite platelets; and (b) reducing the expanded graphite platelets so that essentially all of the individual platelets are less than 200 microns in length, 0.1 micron in thickness. Preferably the chemical agent is an inorganic oxy acid. Preferably the expanding is by microwave or RF heating. Preferably the graphite is surface modified such as with acrylamide.

BRIEF DESCRIPTION OF THE DRAWINGS

FIG. 1 is a scanning electron microscope (SEM) of intercalated graphite flakes.

FIG. 2 is a SEM image of expanded natural graphite flakes wherein the flakes are expanded by microwave.

FIG. 3 is a graph of an x-ray diffraction pattern of intercalated natural graphite of FIG. 1. Some order is seen.

FIG. 4 is a graph of an x-ray diffraction pattern of the expanded natural graphite of FIG. 2. No order is seen.

FIG. 5 is a SEM of pulverized exfoliated (expanded) natural graphite.

FIG. 6 is a graph showing the size distribution of the particles of FIG. 5 after being pulverized.

FIGS. 7 and 8 are graphs showing the flexural modulus (FIG. 7) and strength (FIG. 8) of cured epoxy resins containing 3% by volume of the pulverized graphite particles of FIGS. 5 and 6.

FIG. 9 is a graph of the resistivity of control and graphite nanoplatelet reinforced composites of FIGS. 7 and 8 as a function of volume percent exfoliated graphite (Gr).

FIG. 19 is PAN based carbon fiber, FIG. 20 is carbon film and FIG. 21 is carbon black.

DESCRIPTION OF PREFERRED EMBODIMENTS

Figure 10A:
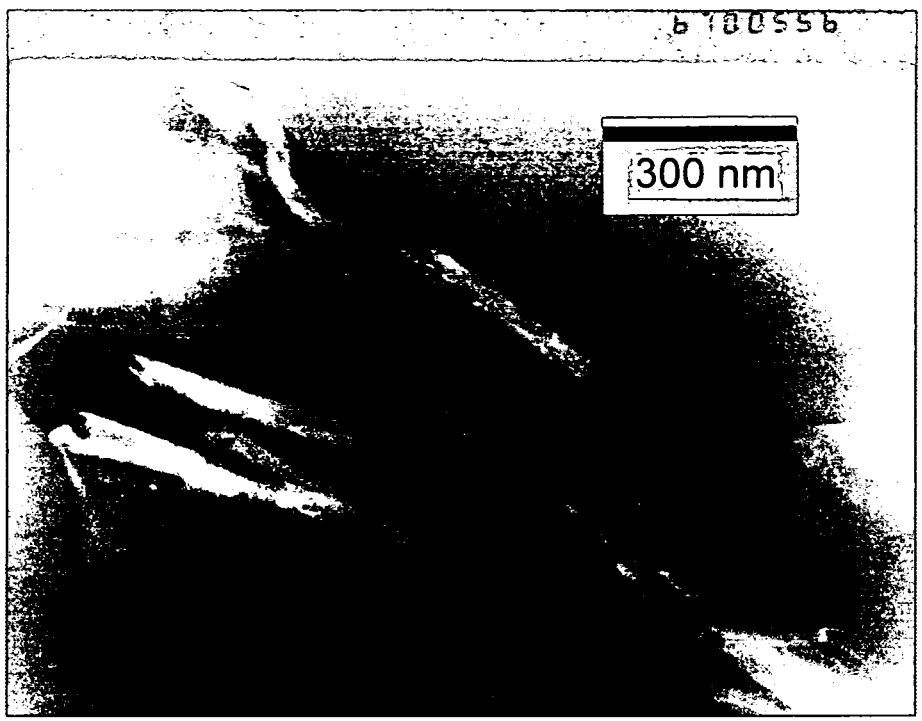
FIGS. 10A and 10B are TEM images of graphite nanoplatelets in the polymer matrix of FIGS. 7 and 8.

Graphite is a layered material. Individual molecular layers are held together with weak Van der Waals forces which are capable of intercalation with organic or inorganic molecules and eventual expansion. These nanosized expanded graphite platelet materials are very large platelets having large diameters and are very thin in thickness. The graphite structure is stiff in bending. Graphite is a very good thermal and electrical conductor.

Expanded graphite provides superior mechanical properties and in addition provides electrical properties if a sufficient amount is present in a polymer matrix. Expanded graphite platelets have interbasal plane surfaces which have reactive sites on the edges of the platelets. Different chemical groups can be added to the edges. The application of an electric field can be used to orient the expanded graphite platelets in a preferred direction creating materials which are electrically or thermally conductive in one direction. Submicron conductive paths can be created to act as nanosized wires.

As used in the present application an expanded graphite is one which has been heated to separate individual platelets of graphite. An exfoliated graphite is a form of expanded graphite where the individual platelets are separated by heating with or without an agent such as a polymer or polymer component. In the present application the term "expanded graphite" is used. The expanded graphite usually does not have any significant order as evidenced by an x-ray diffraction pattern.

The use of microwave energy or RF induction heating provides a fast and economical method to produce expanded graphite nanoflakes, graphite nanosheets, or graphite nanoparticles. The microwave or RF methods are especially useful in large-scale production and are very cost-effective.

The combination of RF or microwave expansion and appropriate grinding technique, such as planetary ball milling (and vibratory ball milling), produces nanoplatelet graphite flakes with a high aspect ratio efficiently. Microwave or RF expansion and pulverization of the crystalline graphite to produce suitable graphite flakes enables control of the size distribution of graphite flakes more efficiently. By incorporating an appropriate surface treatment, the process offers an economical method to produce a surface treated expanded graphite.

Chemically intercalated graphite flakes are expanded by application of the RF or microwave energy. The expansion occurs rapidly. Heating for 3 to 5 minutes removes the expanding chemical. The graphite absorbs the RF or microwave energy very quickly without being limited by convection and conduction heat transfer mechanisms. The intercalant heats up past the boiling point and causes the graphite to expand to many times its original volume. The process can be performed continuously by using a commercially available induction or microwave system with conveyors.

Although a commercial microwave oven operating at 2.45 GHz was used for the following experiments, radio frequency (induction heating) or microwave frequency energy across a wide range can be used for this purpose.

The expanded graphite is pulverized for instance by ball milling, mechanical grinding, air milling, or ultrasonic wave to produce graphite flakes (platelets) with high aspect ratio. These flakes are used as reinforcements in various matrices including polymers and metals. Also these flakes can be used, for instance, as anode materials, or substrates for metal catalysts. The exfoliated graphite flakes can be provided in a polymer matrix composite to improve the mechanical, electrical and thermal properties.

Specifically, intercalated graphite flakes are expanded by application of microwave energy at 2.45 GHz. This process can be done continuously by using a commercially available microwave system with conveyors. After the expansion, the graphite material is calendared, with or without binder resins, to form a flexible graphite sheet. The resultant sheet is cut into various sizes and shapes and used as gaskets, sealing material, electrode substrates, and separators for fuel cells.

Applications for the expanded graphite include thermally, electrically and structural nanoreinforcements for polymers and metals, electrode substrates for batteries, separators for fuel cells, anode material, or substrates for metal catalysts.

EXAMPLE 1

The graphite was expanded before the polymer is introduced. Intercalated graphite flakes were expanded by exposure to microwave energy, typically at 2.45 GHz frequency, for a few seconds to a few minutes in an oven. This process can be done continuously by using commercially available microwave systems with conveyors or batch-style process using individual microwave ovens. An automated continuous system is preferred from an economical point of view. In this case, the intercalated graphite flakes are first dispersed on a conveyor and introduced into the microwave oven, then processed under controlled conditions. Before or during this process additional chemicals/additives can be added to the intercalated graphite flakes to enhance the exfoliation, and/or apply surface treatments to the graphite flakes. After this process, washing and drying processes are applied, if necessary.

Typical starting materials are natural graphite flakes intercalated with oxidizing agents, but synthetic graphite, kish graphite, or the like can also be used. A preferred intercalating agent is a mixture of sulfuric acid or sulfuric acid/phosphoric acid mixture and an oxidizing agent such as nitric acid, perchloric acid, chromic acid, potassium chlorate potassium permanganate, potassium dichromate, hydrogen peroxide, metal halides or the like.

FIG. 1 shows a SEM image of intercalated natural graphite flakes. The microwave process heated the graphite flake, thereby heating the intercalated acid causing a rapid expansion of the graphite flakes perpendicular to the basal planes. During the process, the flakes expanded as much as 300 times or more, but still many of the layers were attached together and form worm-like shapes. FIG. 2 shows a SEM image of expanded graphite material. FIGS. 3 and 4 show XRD data of intercalated natural graphite and expanded graphite processed by the microwave process. As FIG. 4 shows, the x-ray diffraction peak due to the highly and closely aligned graphite sheets was significantly reduced because of the expansion of the intercalated graphite by the microwave process. The expanded graphite can be pressed to form flexible graphite sheet. The thickness of the sheet can be controllable, depending on the application.

The expanded graphite was pulverized into the small platelets which have been crushed. FIGS. 5 and 6 show a SEM image and size distribution of expanded graphite platelets. The size of most graphite particles is 1 um or less after milling.

After the expansion, the graphite material can then be pressed into sheet or pulverized into small flakes. In the former case, the expanded graphite flakes are pressed by calendar roll, press machine, or any other press methods, with or without binder resins, to form a flexible graphite sheet. The resulting sheet can be cut into various sizes and shapes and can be used as gaskets, sealing material, electrode substrates, separators in fuel cells or many other applications. In the latter case, the expanded graphite flakes are pulverized by ball milling, planetary milling, mechanical grinding, air milling, ultrasonic processing or any other milling methods to produce graphite flakes with a high aspect ratio. These expanded flakes can also be given further surface treatments and can be used as reinforcements in various matrices including polymers, ceramics, and metals. Also these flakes and/or sheets can be used as electrodes and/or other parts for batteries, or electrodes, separators, and/or other parts materials for fuel cells, or substrates for various catalysts in many chemical/biological reactions.

The expanded graphite nanoplatelets can be incorporated into various types of matrices, including thermoplastic and thermoset polymers. Before mixing with the polymeric matrix, surface treatments can be applied to the graphite nanoplatelets to enhance the adhesion between graphite platelets and matrix and the dispersion of the platelets in the polymer. An example of composite fabrication and its properties is described below.

EXAMPLE 2

Graphite flake that has been treated in the sulfuric acid to intercalate the graphite with sulfuric acid in between the layers was used. A commercial source used in this invention is GRAFGUARD™ which is produced by UCAR Carbon Company (Lakewood, Ohio).

Samples of acidic, neutral or basic intercalated graphite (GRAFGUARD™ 160-50N, 160-50A or 160-50B from UCAR Carbon Company, Parma, Ohio) were mixed into pure epoxy resin such as diglycidylether of bisphenol-A (DGEBA) Shell Epon 828 or equivalent. The mixture was heated to temperatures of at least 200° C. at which time approximately the graphite experiences a 15% weight loss due to the release of the trapped sulfuric acid compounds. At the same time, the epoxy molecule entered the space between the graphite layers. A very large volume expansion was encountered which results in sorption of the epoxy in between the graphite layers. This expanded graphite was dry to the touch indicating that all of the epoxy has been sucked into the galleries between the platelets. After cooldown, further epoxy and a curing agent were added to this mixture and a composite material was fabricated. There are various other routes available to attain the same end point of removal of the sulfuric acid and intercalation of the epoxy or similar polymer monomer in-between the graphite layers. One way is to remove the acid from the expanded graphite by heating.

Samples were made and mechanical properties were measured to show that the graphite has been intercalated and exfoliated (expanded) by the polymer.

EXAMPLE 3

Composite samples were fabricated using the following steps. First, 1, 2, or 3 vol % (1.9, 3.8 or 5.8 wt %) of the expanded graphite nanoplatelets of Example 2 were added into the epoxy systems. (Epoxide; Shell Chemicals, EPON™ 828 (DGEBA), Curing Agent: Huntsman Corporation, JEFFAMINE™ T403. The weight ratio of EPON™ 828 to JEFFAMINE™ T403 was 100 to 45.) Then the mixtures were cured by heating at 85° C. for 2 hours followed by 150° C. for 2 hours. The heating ramp rate was 3° C. per min. At the same time, a reference system was made that did not have expanded graphite platelets in it but was composed of the same epoxy system from the same batch. The mechanical properties of these samples were determined. These samples were investigated by flexural test. Also, the AC conductivity of these materials was measured.

FIGS. 7 and 8 show the results of the flexural test. The composite materials with 3 vol % graphite showed about 28% of improvement in modulus and 12% improvement in strength compared to the matrix material. This is an excellent increase with respect to the relatively small amount of platelets reinforcements added to the system.

FIG. 9 shows the AC resistivity of the control epoxy and the graphite nanoplatelet reinforced composites. With 2% weight of graphite platelets, the composite began displaying some conductivity, which means that percolation threshold of this material exists around 2% weight percent (1% in value). With 3% volume graphite platelets, the composite shows a reduction of about 10 orders of magnitude which is a low enough resistivity for electrostatic dissipation or electrostatic painting applications.

Figure 10B:
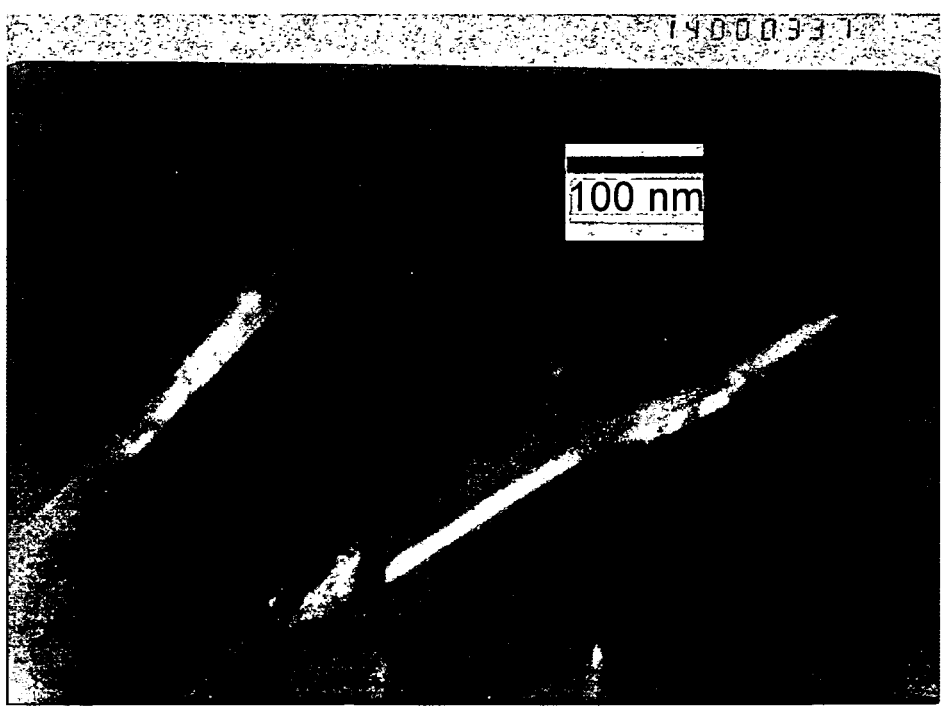

The microstructure of the composite was observed by preparing microtomed samples and viewing them in the transmission electron microscope (TEM). The images are shown in FIGS. 10A and 10B. According to these images, the thickness of these nanoplatelets was estimated around 15 to 30 nm. Multiple treatments by the microwave process can reduce the platelet thickness to much smaller dimensions.

EXAMPLE 4

This Example shows acrylamide grafting on a microwaved and milled graphite platelet. The objective was to demonstrate the mechanical properties of composites reinforced with acrylamide grafted graphite nanoplatelets.

The graphite sample was microwave-exfoliated and vibratory milled. The vibratory milling was for 72 hrs. The average diameter was about 1 um.

The conditions for the grafting process were as follows:

Factors
1. Solvent System (O2 Plasma treatment: 1 min. moderate reflux condition)
   Benzene
   Acetone
   Isopropyl alcohol
   Benzene/Acetone=50/50
   Benzene/Acetone=75/25
   Benzene/Acetone=87.5/12.5
2. O2 Plasma Treatment Time (solvent: Benzene. Moderate reflux condition)
   0 min
   0.5 min
   1 min
   3 min
3. Reflux condition solvent: Benzene. O2 Plasma treatment: 1 min)
   Moderate reflux. Hot Plate Temperature=110~120° C.
   Vigorous reflux. Hot Plate Temperature=140~150° C.

The reaction procedure was:

The graphite samples were first treated with O2 plasma. (RF 50%); the sample was then dispersed in a 1M-Acrylamide solution and refluxed for 5 hours; and the sample was filtered and washed with acetone, then dried in a vacuum oven.

1. Solvent System

| Solvent | Organic Component |
|---|---|
| Benzene | 15.37 wt % |
| Acetone | 6.39 wt % |
| Isopropyl Alcohol | 2.16 wt % |
| Benzene/Acetone = 50/50 | 21.84 wt % |
| Benzene/Acetone = 75/25 | 18.95 wt % |
| Benzene/Acetone = 87.5/12.5 | 17.75 wt % |

2. O2 Plasma Treatment Time

| Plasma Treatment Time | Organic Component |
|---|---|
| 0 min | 2.91 wt % |
| 0.5 min | 9.73 wt % |
| 1 min | 15.37 wt % |
| 3 min | 11.53 wt % |

3. Reflux Condition

| Reflux Condition | Organic Component |
|---|---|
| Moderate Reflux | 15.37 wt % |
| Vigorous Reflux | 38.25 wt % |

Figure 11:
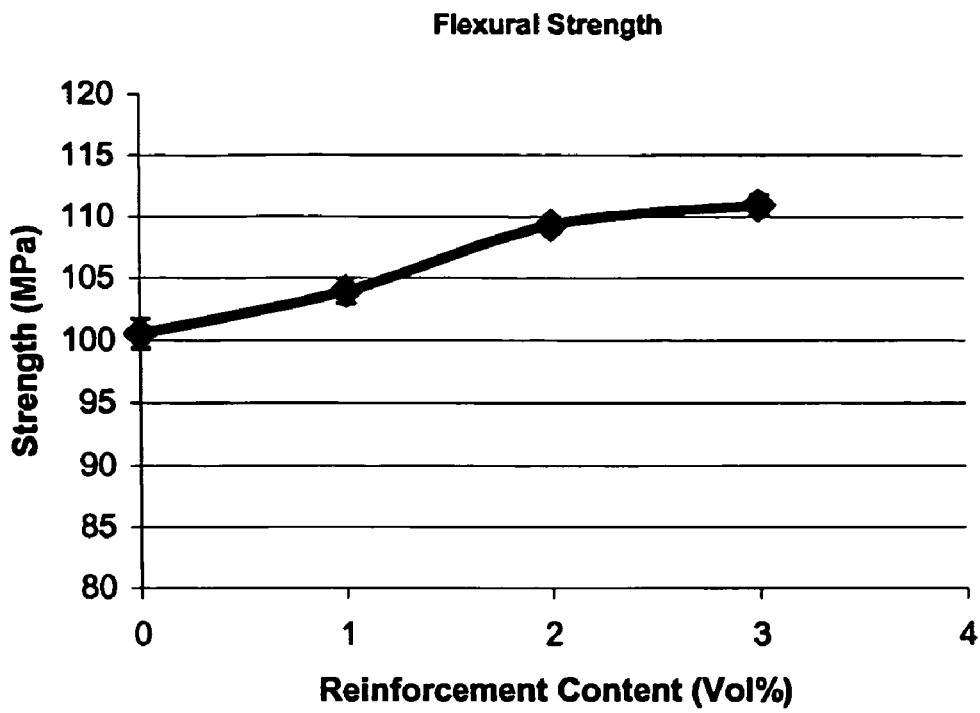
FIG. 11 is a graph showing flexural strength versus expanded graphite content for acrylamide grafted graphite.
Figure 12:
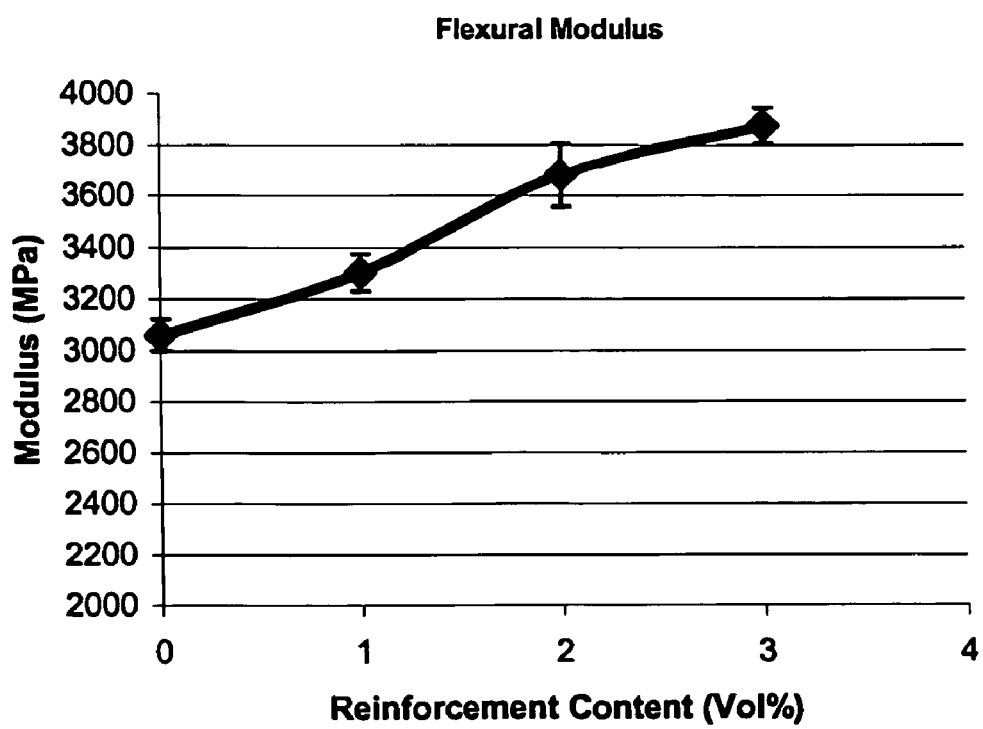
FIG. 12 is a graph showing flexural modulus versus acrylamide grafted expanded graphite content for acrylamide grafted graphite.
Figure 13:
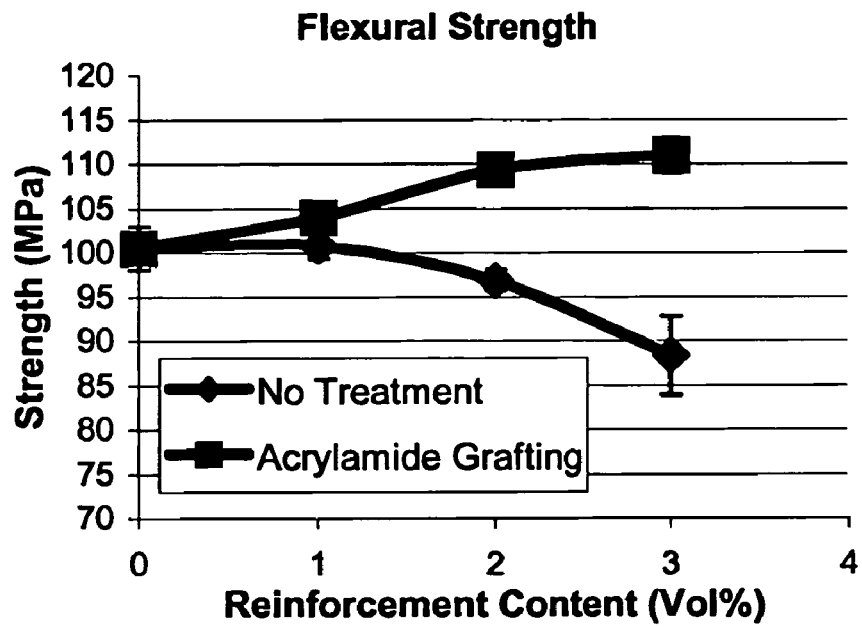
FIGS. 13 to 18 are graphs showing flexural strength and modulus for acrylamide modified graphite and various carbon materials. "MW" is microwave, and "AA" is acrylamide.
Figure 14:
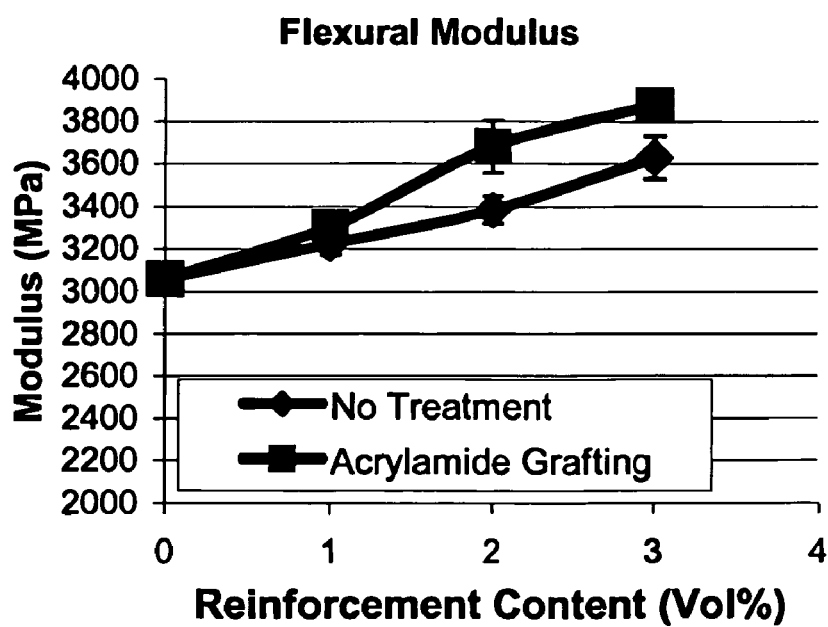
Figure 15:
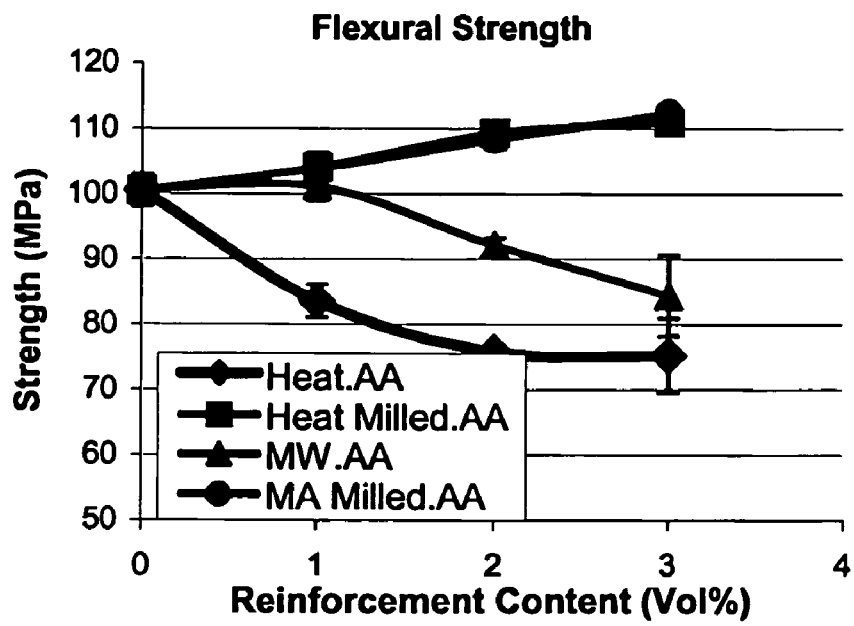
Figure 16:
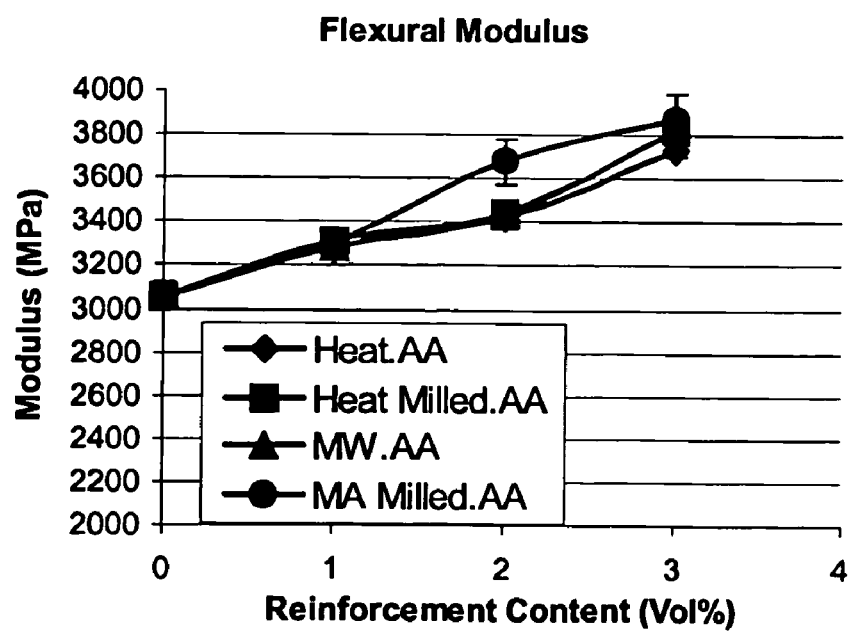
Figure 17:
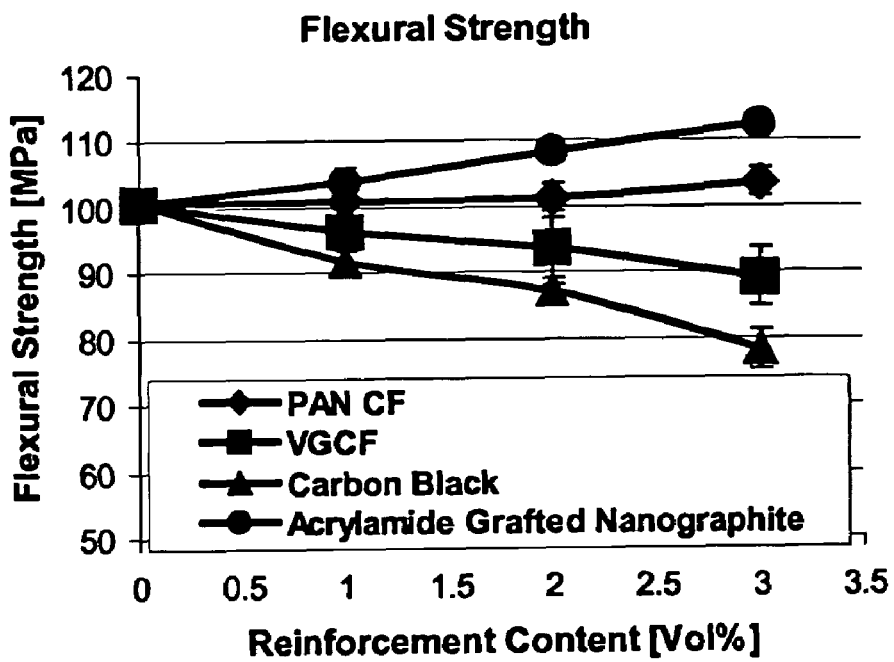
Figure 18:
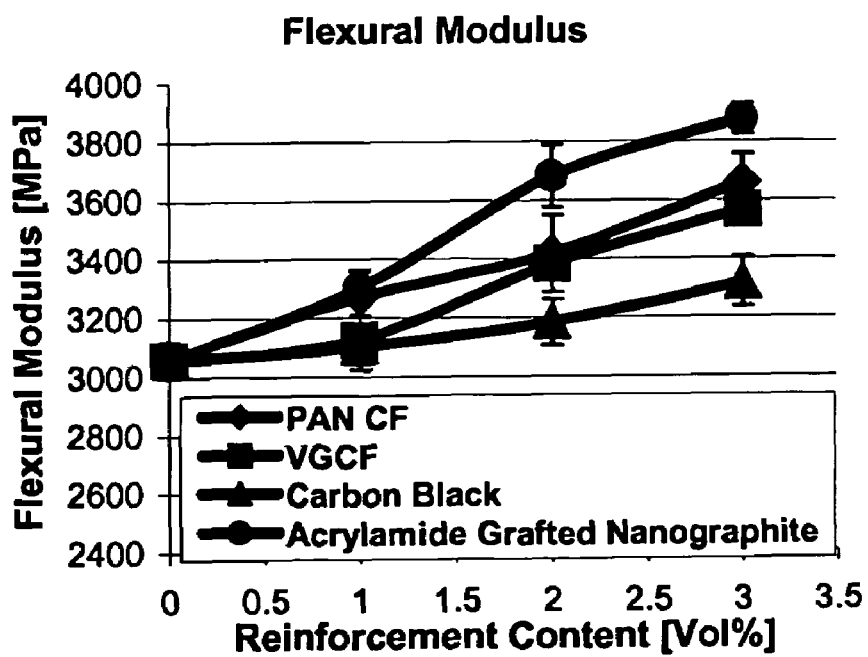

The mechanical properties of composites of acrylamide grafted graphite are shown in FIGS. 11 and 12 for a graphite sample with 38.25 wt % acrylamide.

The effect of acrylamide grafting in forming composites with the epoxy resin of Example 3 is shown in FIGS. 13 to 18.

EXAMPLE 5

Composites reinforced with nanoscopic graphite platelets were fabricated and their properties were investigated as a practical alternative to carbon nanotubes. The x-ray Diffraction (XRD) and Transmission Electron Microscopy (TEM) results indicated that the graphite flakes were well-exfoliated to achieve platelets with thicknesses of 20 nm or less. Flexural tests and Differential Mechanical Thermal Analysis (DMTA) results show that nanocomposite materials made with these nanographite platelets have higher modulus than that of composites made with commercially available carbon reinforcing materials (i.e., PAN based carbon fiber, Vapor Grown Carbon Fiber [VGCF], and Nanoscopic High-structure Carbon Black). With the proper surface treatment, the graphite nanoplatelets in polymeric matrices also showed better flexural strength than composites with other carbon materials. Impedance measurements have shown that the exfoliated graphite plates percolate at below 3 volume percent, which is better than carbon fiber and comparable with other carbon materials, and exhibit a ~10 order of magnitude reduction in impedance at these concentrations.

In this Example, a special thermal treatment was applied to the graphite flakes to produce exfoliated graphite reinforcements. The composite material was fabricated by combining the exfoliated graphite flakes with an amine-epoxy resin. X-ray Diffraction (XRD) and Transmission Electron Microscopy (TEM) were used to assess the degree of exfoliation of the graphite platelets. The mechanical properties of this composite were investigated by flexural testing. The glass transition temperature (Tg) of composite samples was determined by Differential Mechanical Thermal Analysis (DMTA). The coefficient of thermal expansion was examined by Thermal Mechanical Analysis (TMA). The electrical conductivity was investigated by impedance measurements using the 2-probe method.

EXPERIMENTAL

Materials

Epoxy was used as the matrix material. Diglycidyl ether of bisphenol A (Epon 828) was purchased from the Shell Chemical Co. Jeffamine T403 from Huntsman Petrochemical was used as the curing agent for this matrix system.

Figure 19:
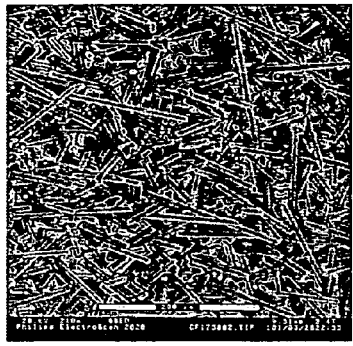
FIGS. 19 to 21 are SEM images of various carbon materials.
Figure 20:
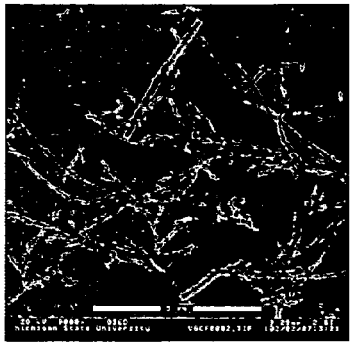
Figure 21:
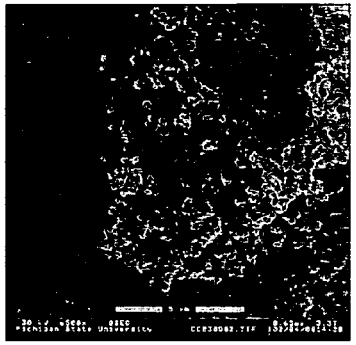
Figure 22:
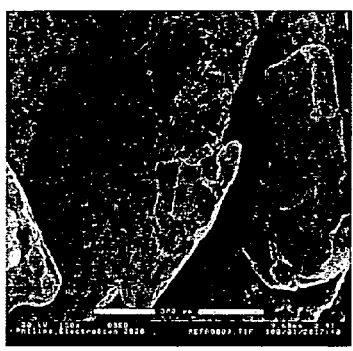
FIGS. 22 to 24 are SEM images showing graphite in various forms.
Figure 23:
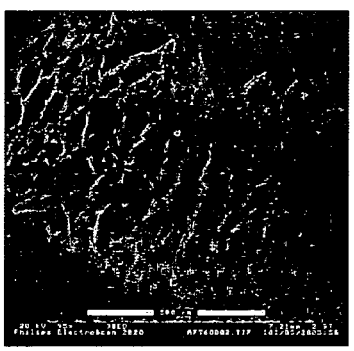
Figure 24:
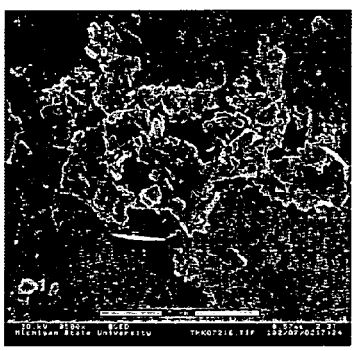
Figure 25:
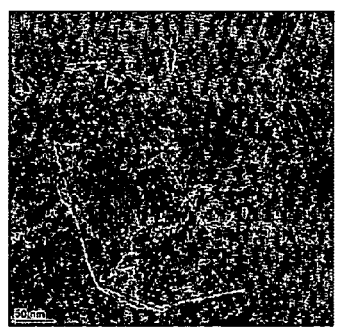
FIGS. 25 and 26 are TEM images of graphite nanoplatelets.
Figure 26:
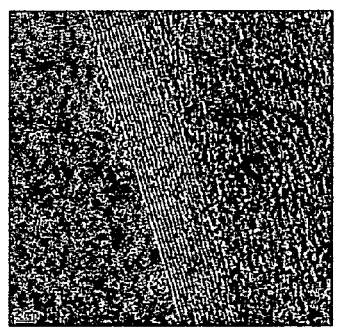

Graphite was obtained from UCAR International Inc. and were intercalated by acids. PAN based carbon fiber (PANEX 33 MC Milled Carbon Fibers, average length: 175 um, average diameter: 7.2 um, specific gravity: 1.81 g/cm$^3$, Zoltek Co.), VGCF (Pyrograf III, PR-19 PS grade, Length: 50~100 um, Average diameter: 150 nm, Specific gravity: 2.0 g·cm$^3$, Pyrograf Products, Inc.), and nanosize carbon black (KETJENBLACK EC-600 JD, Average diameter: 400~500 nm, Specific gravity: 1.8 g/cm$^3$, Akzo Novel Polymer Chemicals LLC) were used as comparison. The SEM images of these materials are shown in FIGS. 19, 20 and 21.

Figure 27:
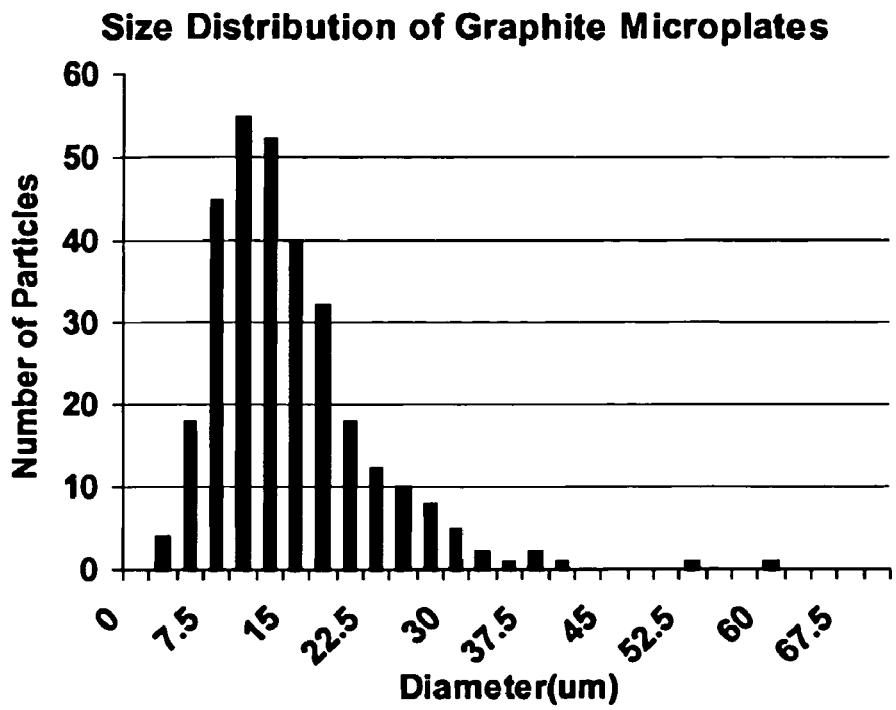
FIGS. 27 and 28 are graphs showing size distribution of graphite microplates and graphite nanoplatelets.
Figure 28:
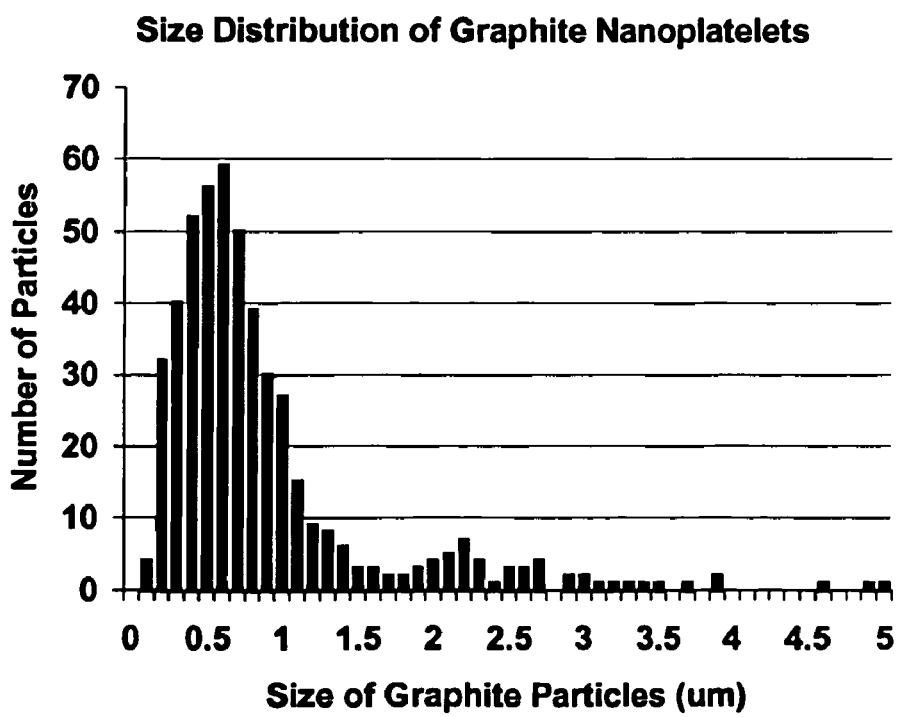

The UCAR graphite was processed thermally. After the treatment, these graphite flakes showed significant expansion due to the vaporization of intercalated acid in the graphite galleries. The expanded graphite flakes were pulverized by use of an ultrasonic processor and mechanical milling. The average diameter and thickness of the flakes pulverized only by ultrasonic processor were determined as 13 um and 30 nm, respectively (Graphite microplate). Those of the flakes after milling were determined as 1.1 um and 20 nm, respectively (Graphite nanoplatelet). The SEM and TEM images of as-received, expanded, and pulverized graphite flakes are shown in FIGS. 22 to 25. The size distribution of the graphite microplate and nanoplatelets is shown in FIGS. 27 and 28.

Composite Fabrication

The calculated amount of reinforcements were added to DGEBA and mixed with the aid of an ultrasonic homogenizer for 5 minutes. Then stoichiometric amount of Jeffamine T403 were added and mixed at room temperature. The ratio of DGEBA/Jeffamine is 100/45 by weight. The system was outgassed to reduce the voids and cured at 85° C. for 2 hours, followed by post curing at 150° C. for 2 hours. The density of graphite flakes was assumed as 2.0 g/cm$^3$. The densities of other carbon materials were obtained from manufactures. The density of the epoxy matrix was measured as 1.159 g/cm$^3$. Using these values, the volume fraction of graphite platelets in composite samples was calculated.

Surface Treatments of Graphite Nanoplatelets

Surface treatments that can introduce carboxyl and/or amine group were applied to the graphite according to the following procedures.

Nitric Acid Treatment

A graphite nanoplatelet sample was dispersed in 69% (weight) of nitric acid and heated at 115° C. for 2 hours. The sample was then washed by distilled water and dried in a vacuum oven.

O₂ Plasma Treatment

Graphite nanoplatelets were dispersed on an aluminum foil and covered by a stainless steel mesh. Then the sample was treated by O2 plasma at RF level of 50% (275 W) for 1 min.

UV/Ozone Treatment

Graphite nanoplatelets were packed in a quartz tube (ID: 22 mm, OD: 25 mm, Transparent to UV light down to wave length of 150 nm). The tube was filled with ozone (Concentration: 2000 ppm, Flow rate: 4.7 L/min) and rotated at 3 rpm. Then the samples were exposed to UV light for 5 min.

Amine Grafting

Graphite nanoplatelets were treated by $O_2$ plasma to introduce carboxyl group. Then the sample was dispersed in tetraethylenepentamine (TEPA) and heated at 190° C. for 5 hours to graft TEPA by forming an amide linkage. The sample was washed with distilled water and methanol, then dried in a vacuum oven (Pattman, Jr., et al., Carbon, Vol. 35, No. 3, pp. 217 (1997)).

Acrylamide Grafting

Graphite nanoplatelets were treated by $O_2$ plasma to introduce peroxide. Then the sample was dispersed in 1M acrylamide/benzene solution and heated at 80° C. for 5 hours to initiate radical polymerization of acrylamide. The sample was washed with acetone and dried in a vacuum oven (Yamada, K., et al., J. Appl. Polym. Sci., Vol. 75, pp. 284 (2000)).

TABLE 1

XPS Data of Surface Treated Graphite Nanoplatelets and Other Carbon Materials

| | C | O | N | S | Na | Al | Others | O/C | N/C |
|---|---|---|---|---|---|---|---|---|---|
| Graphite Nanoplatelet | 93.5 | 6.1 | 0.0 | 0.0 | 0.0 | 0.0 | 0.4 | 0.055 | 0.000 |
| HNO₃ Treatment | 92.2 | 7.5 | 0.0 | 0.0 | 0.0 | 0.0 | 0.3 | 0.075 | 0.000 |
| O₂ Plasma Treatment | 91.0 | 8.8 | 0.0 | 0.0 | 0.0 | 0.0 | 0.2 | 0.093 | 0.000 |
| UV/O₃ Treatment | 94.5 | 4.9 | 0.0 | 0.0 | 0.0 | 0.0 | 0.5 | 0.042 | 0.000 |
| Amine Grafted | 89.2 | 6.8 | 3.3 | 0.0 | 0.0 | 0.0 | 0.7 | 0.061 | 0.037 |
| Acrylamide Grafted | 78.3 | 14.0 | 7.8 | 0.0 | 0.0 | 0.0 | 0.0 | 0.177 | 0.100 |
| PAN based CF | 88.9 | 9.3 | 1.6 | 0.0 | 0.3 | 0.0 | 0.0 | 0.105 | 0.018 |
| VGCF | 95.1 | 4.9 | 0.0 | 0.0 | 0.0 | 0.0 | 0.0 | 0.052 | 0.000 |
| Nanosized Carbon Black | 91.7 | 8.2 | 0.0 | 0.0 | 0.0 | 0.0 | 0.0 | 0.089 | 0.000 |

RESULTS AND DISCUSSION

XPS

The effect of surface treatments was investigated by X-ray Photoelectron Spectroscopy (XPS). The results are shown in Table 1. From this data, the acrylamide grafting treatment showed the highest O/C and N/C ratio, suggesting many acrylamide groups were introduced. The amine grafting treatment also showed an increase in N/C ratio, suggesting amine groups were introduced. $O_2$ plasma treatment showed an increased O/C ratio, suggesting carboxyl groups were introduced. The other two treatments didn't show impressive results.

Mechanical Properties

Effect of Surface Treatments on Mechanical Properties

Figure 29:
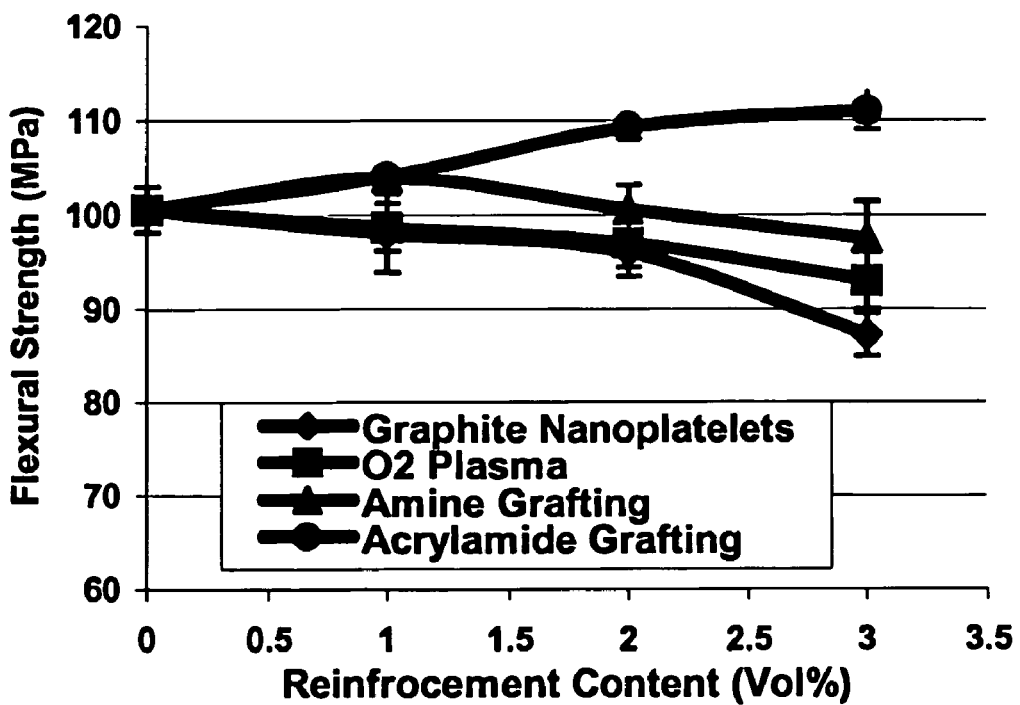
FIGS. 29 and 30 are graphs comparing flexural strength and modulus for various samples including graphite modified with acrylamide.
Figure 30:
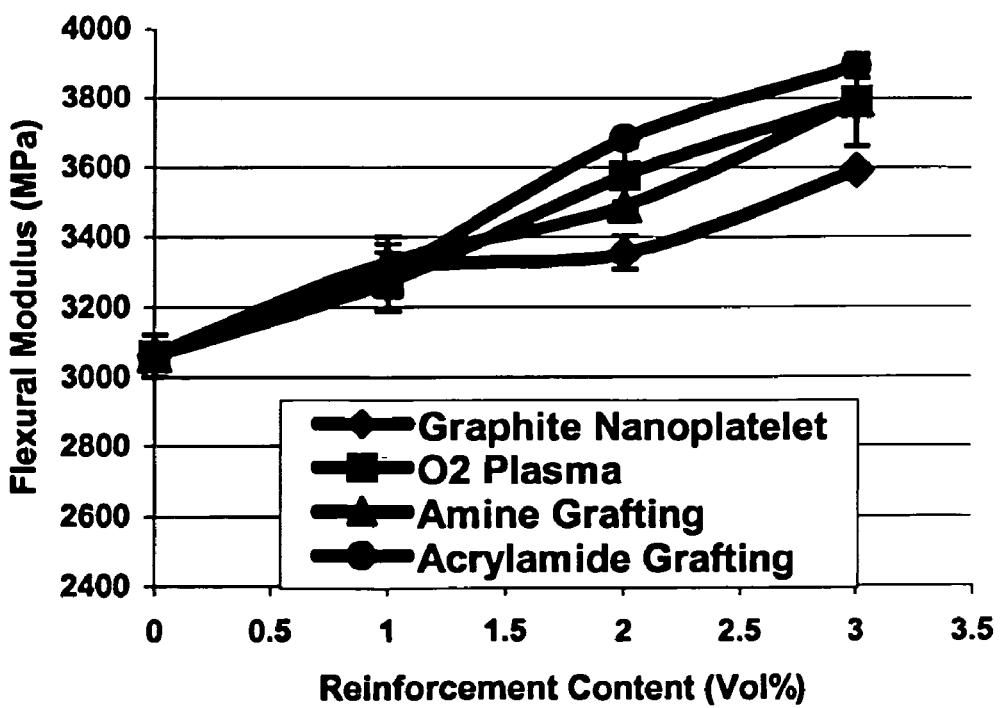

Graphite nanoplatelets treated by $O_2$ plasma, amine grafting, and acrylamide grafting were prepared and used as reinforcements to fabricate composites with 1.0, 2.0 and 3.0 vol % of graphite flakes. The flexural strength and modulus of each sample are summarized in FIGS. 29 and 30.

The results indicate that the acrylamide grafting was the most effective surface treatment in terms of both strength and modulus enhancements. This is supported by XPS data that showed largest N/C ratio for acrylamide grafting. These data suggest that the amine groups grafted on graphite nanoplatelets improve the compatibility between the graphite nanoplatelets and the matrix and form a bond with the epoxy matrix and improve mechanical properties.

Comparison with Commercially Available Carbon Materials

Figure 31:
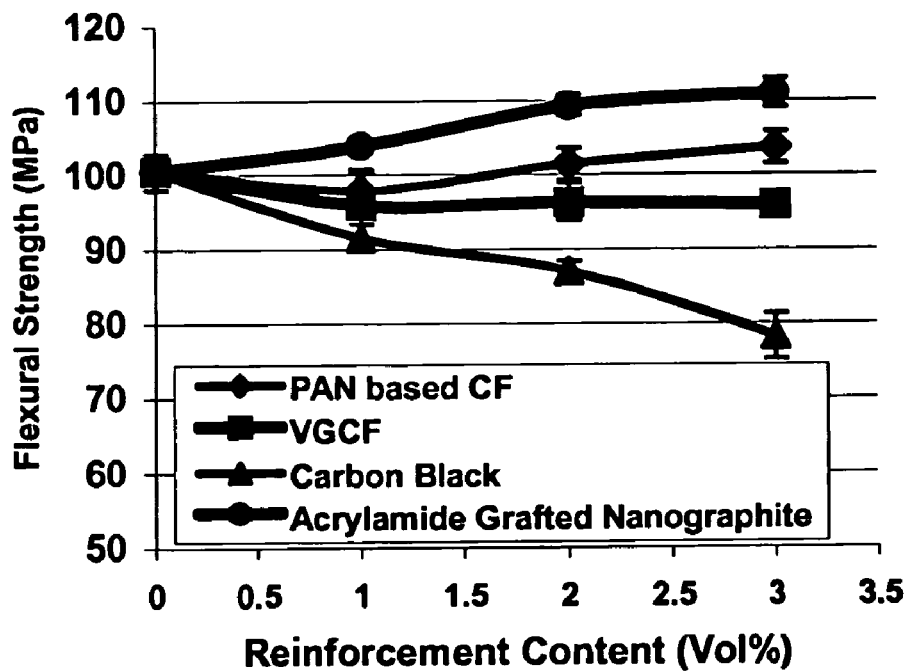
FIGS. 31 and 32 are graphs of flexural strength and modulus for various carbon containing materials versus acrylamide grafting.
Figure 32:
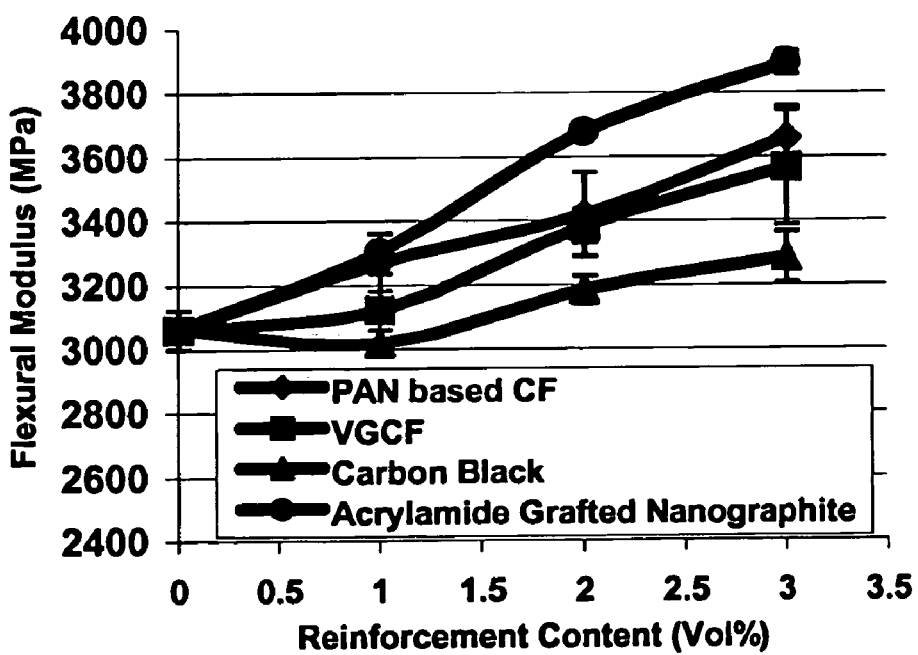

Composites reinforced with PAN based carbon fibers, VGCFs, and nanosize carbon blacks were fabricated. The flexural properties of these composites were measured and compared with those of composites with acrylamide-grafted nanographite. The results are shown in FIGS. 31 and 32. Here acrylamide grafted nanographite showed the best results in terms of both strength and modulus enhancement. This implies that the acrylamide grafting treatment is a very effective surface treatment for graphite nanoplatelets.

Coefficient of Thermal Expansion

Figure 33:
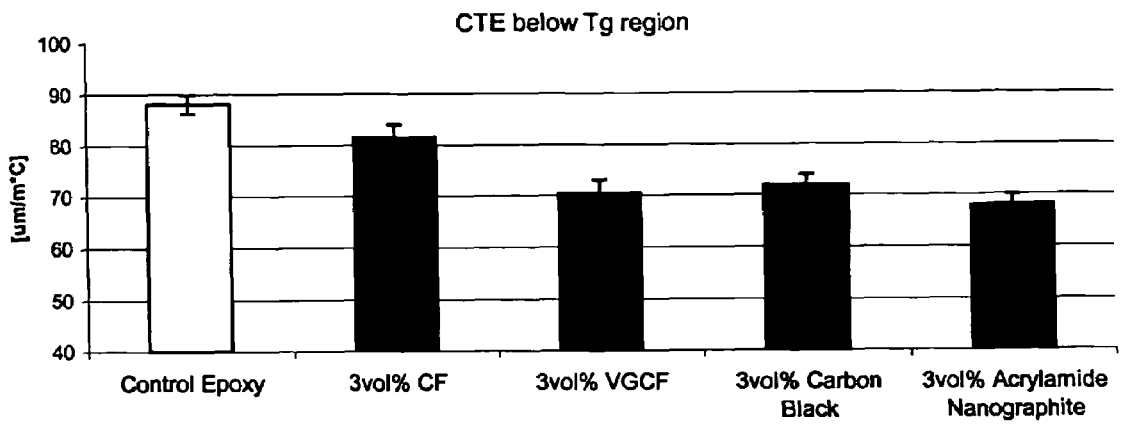
FIG. 33 is a graph showing coefficient of thermal expansion (CTE) of various composites with 3% by volume reinforcements and without reinforcement.

Coefficient of thermal expansion (CTE) of composites with 3 vol % of acrylamide grafted nanographite, PAN based carbon fiber, VGCF, or nanosize carbon black were determined by TMA. The results are shown in FIG. 33. The acrylamide grafted nanographite showed the lowest CTE, indicating good dispersion and strong bonding between the nanoreinforcements and the matrix.

Tg

Figure 34:
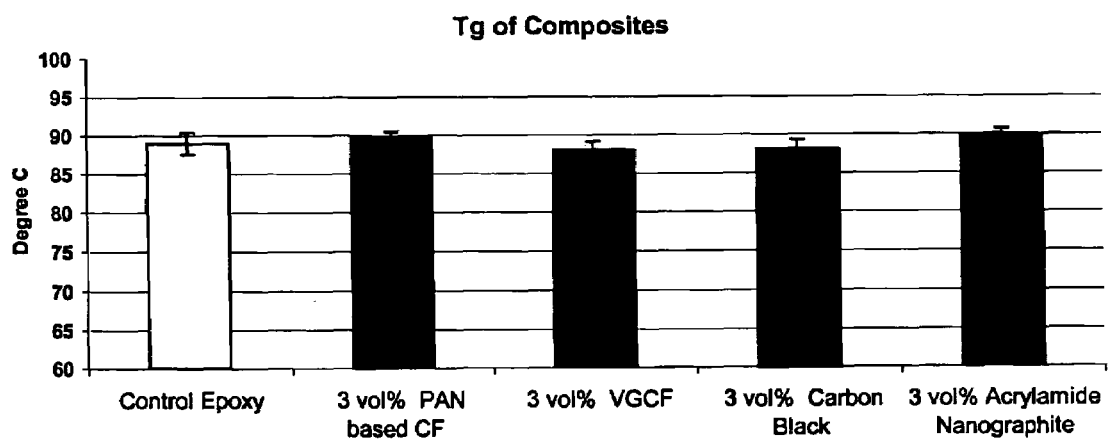
FIG. 34 is a graph showing Tg for various composites with 3% volume percent of reinforcements and without reinforcements.

Tg of composites with 3 vol % of acrylamide-grafted nanographite, PAN based carbon fiber, VGCF, or nanosize carbon black were determined by DMTA. The results are shown in FIG. 34. The acrylamide grafted nanographite showed the slightly higher Tg, but the difference is negligible considering the error margin of the results. Thus these reinforcements didn't affect Tg of epoxy matrix.

Electrical Property

Figure 35:
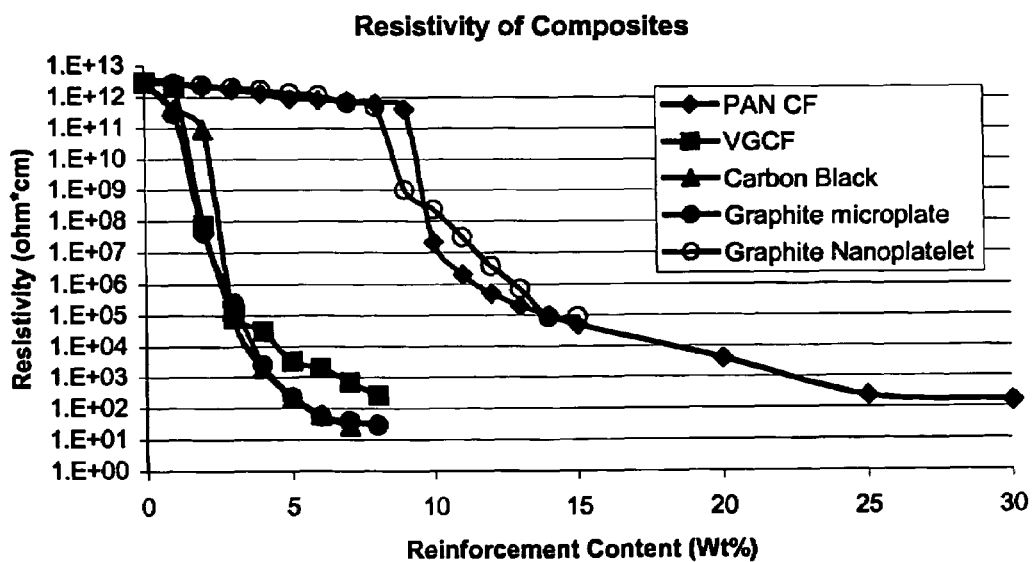
FIG. 35 is a graph showing electrical resistivity of the components versus percentage of reinforcement by weight.
Figure 36:
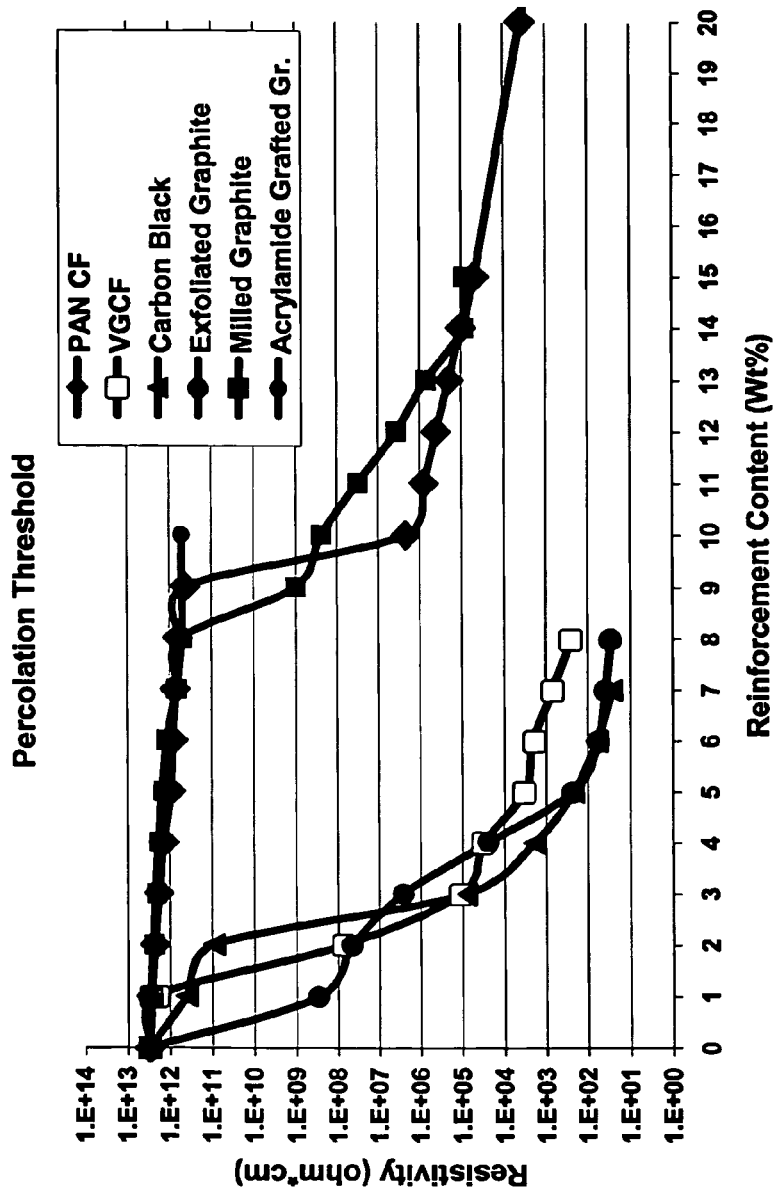
FIG. 36 is a graph showing electrical percolation threshold for various composites as a function of weight percent.
Figure 37:
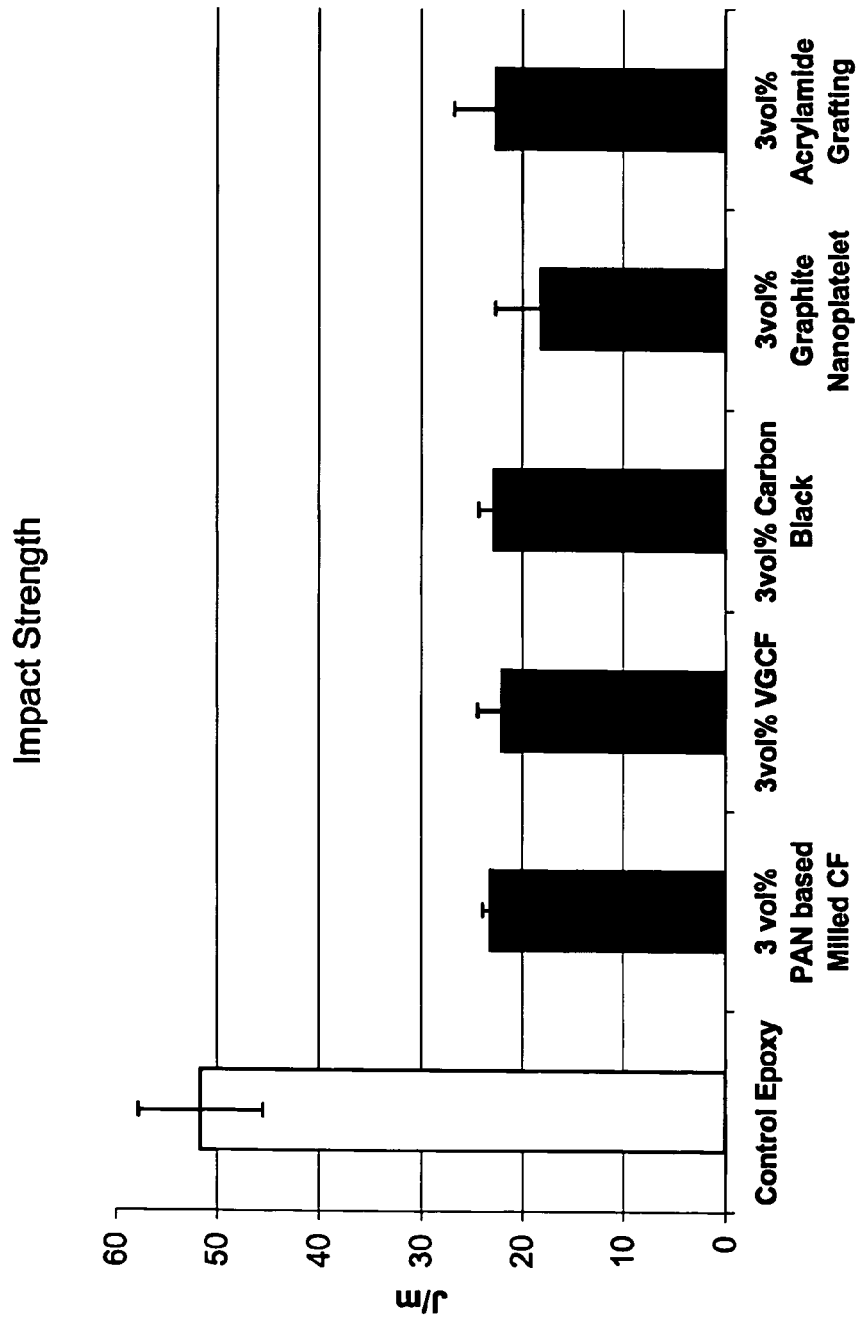
FIG. 37 is a graph showing impact strength for various composites.

The electrical resistivity of the composites with various reinforcement contents were determined. The reinforcements used were PAN based carbon fiber, VGCF, nanosize carbon black, graphite microplate (exfoliated and sonicated, but not milled), and graphite nanoplatelet. The size of each composite sample was about 30×12×8 mm. Each sample was polished and gold was deposited on the surface to insure good electrical contacts. The results are summarized in FIG. 35. The VGCF, carbon black and graphite microplate percolated at around 2 wt % (1 vol %) while conventional carbon fiber and graphite nanoplatelet showed percolation threshold of about 8 to 9 wt % (5 to 6 vol %). Among the former three reinforcements, graphite microplatelets and carbon blacks produced composites with the lowest resistivity, which reached around $10^{-1.5}$ ohm*cm. Thus, the exfoliated graphite sample also showed excellent electrical property as reinforcement in polymer matrix.

As shown by this Example, a new nanoplatelet graphite material was developed by expansion (exfoliation) of graphite. An appropriate surface treatment was established for the new material, which produced a nanographite that increased the mechanical properties of an epoxy system better than some commercially available carbon materials at the same volume percentage. In addition, the expanded (exfoliated) graphite material has been shown to percolate at only 1 volume percent. Measurement of the impedance of this material indicates that it could be used to produce polymer matrix composites for new applications such as electrostatic dissipation and EMI shielding.

The present invention provides a fast and economical method to produce expanded graphite particles, expanded by using RF or microwave energy as the expansion method. It is especially useful in large-scale production and could be a very cost-effective method which would lead to increased use of the exfoliated graphite material.

Figure 38:
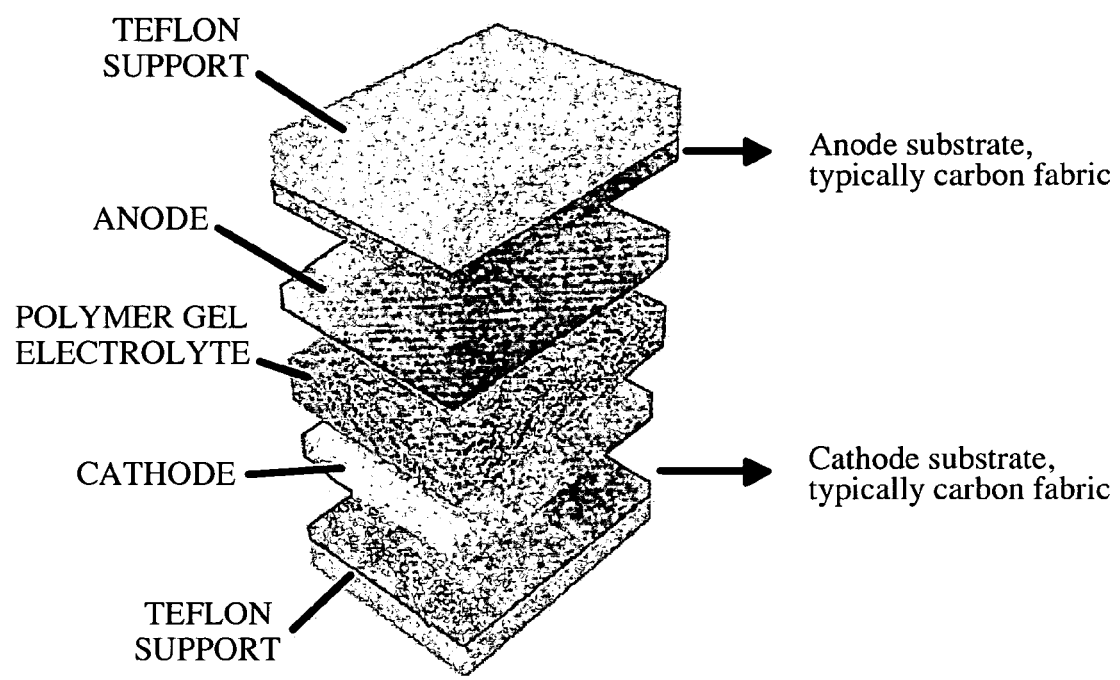
FIG. 38 is a separated perspective view of the basic structure of a polymer battery. Cathode and Anode: electrically conducting polymer on substrate. Polymer gel electrolytes: Ionically conducting polymer gel film.
Figure 39:
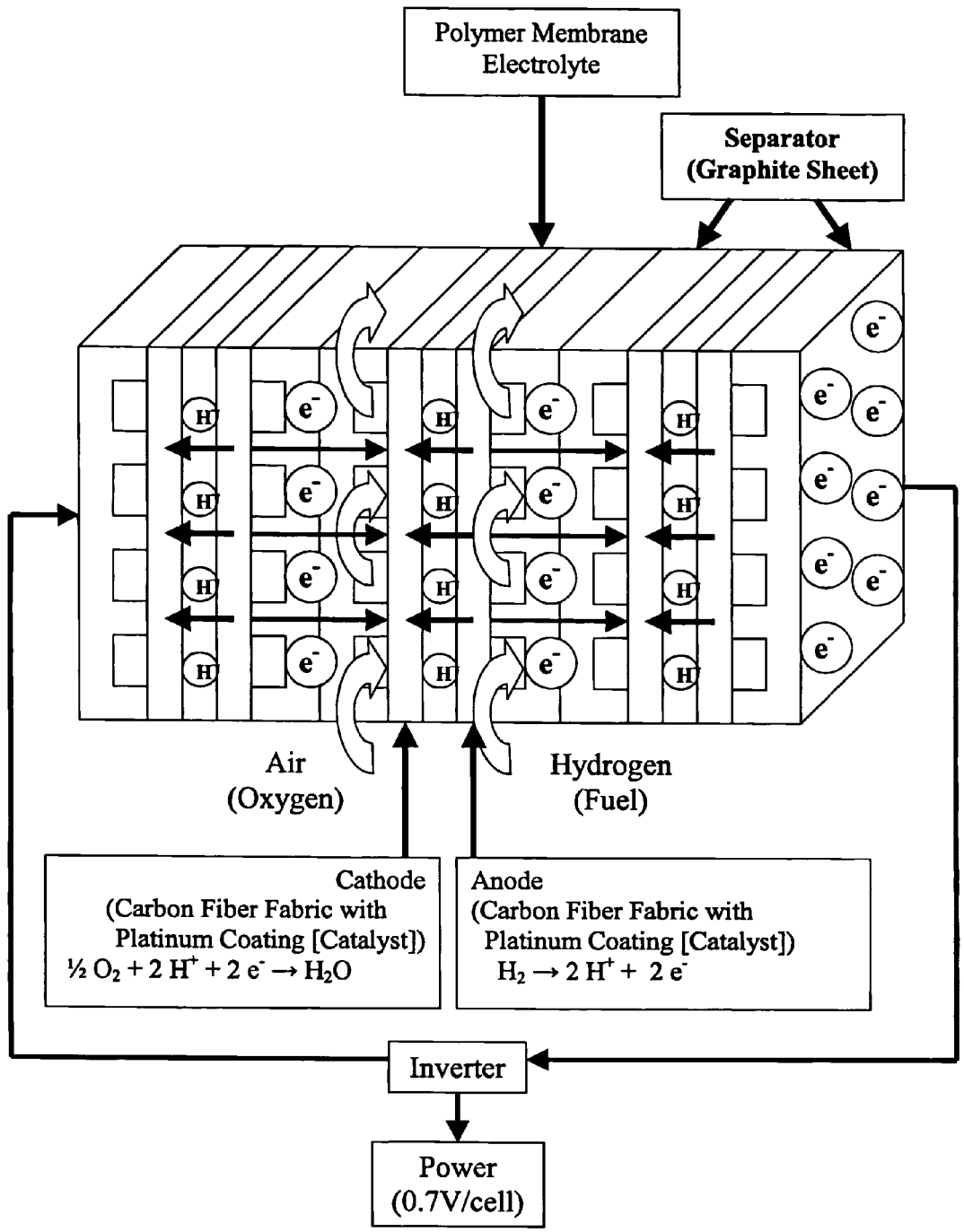
FIG. 39 is a schematic view of the basic structure of a fuel cell.

The expanded graphite can be compressed or calendared to make sheets with or without resins and/or other additives. These sheets can be used as insulating material. In furnaces or gaskets/sealing materials for internal combustion engines. Also these sheets can be used as electrodes substrates for polymer batteries (FIG. 38) or separator (or fluid flow field plates) for fuel cells (FIG. 39).

The expanded graphite can be pulverized into platelets with an appropriate grinding method. Platelets with a high aspect ratio can be used as reinforcements in composites, which have high mechanical properties as well as good electrical and thermal conductivity.

Figure 40:
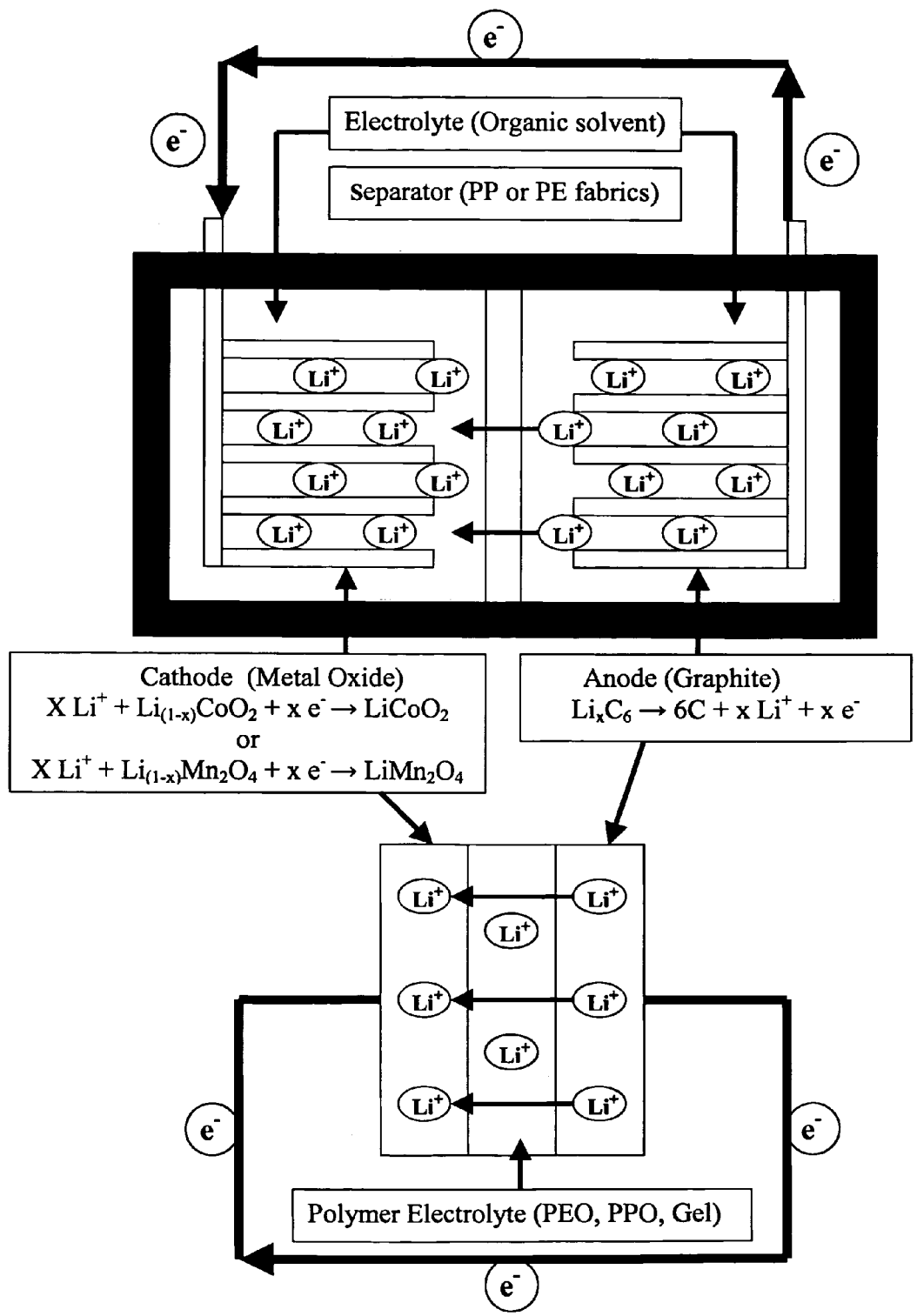
FIG. 40 is a schematic view of the basic structure of a lithium ion-battery.

Expanded graphite with an appropriate platelet size can hold and release metal atoms such as lithium, which is suitable as anode material for lithium-ion or lithium-polymer batteries (FIG. 40).

It is intended that the foregoing description be only illustrative of the present invention and that the present invention be limited only by the hereinafter appended claims.

We claim:

1. A method for preparing a shaped composite material which comprises:
   (a) providing a mixture of a finely divided expanded graphite wherein platelets of a graphite precursor which is acid intercalated has been heated with a first portion of a polymer to produce the expanded and exfoliated graphite with the polymer in galleries between layers of the platelets and to remove the acid and a second portion of the polymer with the first portion of the polymer expanded graphite dispersed therein; and
   (b) forming the shaped composite material from the mixture.

2. A method for preparing a shaped composite material which comprises:
   (a) providing a mixture of an expanded graphite having single platelets wherein platelets of a graphite precursor which is acid intercalated has been heated with a first portion of a polymer to produce a first polymer expanded and exfoliated graphite with the polymer in galleries between layers of the platelets and to release the acid wherein the graphite precursor has a length less than about 200 microns and a thickness of less than about 0.1 microns and a second polymer with the first portion of the polymer expanded graphite dispersed therein, wherein the composite material contains up to about 50% by volume of the first portion of the polymer expanded graphite platelets;
   (b) forming the shaped composite material from the mixture.

3. The method of claims 1 or 2 wherein the first portion of the polymer expanded graphite is provided in the second portion of the polymer in an amount sufficient to render the shaped composite conductive.

4. The method of claims 1 or 2 wherein the polymer is a thermoplastic or thermoset polymer.

5. The method of claims 1 or 2 wherein the graphite precursor has been treated with a fuming oxy acid and heated with the first portion of the polymer to provide the first portion of the polymer expanded graphite and to remove at least a portion of the acid.

6. The method of any one of claims 1 or 2 wherein the second portion of the polymer is a curable thermoset resin which is mixed with the first portion of the polymer expanded graphite and cured.

7. The method of claims 1 or 2 wherein the shaped composite material contains less than 8% by weight of the expanded graphite.

* * * * *

UNITED STATES PATENT AND TRADEMARK OFFICE
CERTIFICATE OF CORRECTION

| | | |
|---|---|---|
| PATENT NO. | : 7,550,529 B2 | Page 1 of 1 |
| APPLICATION NO. | : 11/363336 | |
| DATED | : June 23, 2009 | |
| INVENTOR(S) | : Lawrence T. Drzal and Hiroyuki Fukushima | |

It is certified that error appears in the above-identified patent and that said Letters Patent is hereby corrected as shown below:

Title Page, Please insert related U.S. application data --This application is a continuation of application number 10/659,577 filed on September 10, 2003, which claims benefit of U.S. Provisional Application Number 60/410,263 filed on September 12, 2002.--

Signed and Sealed this

Twenty-second Day of December, 2009

David J. Kappos
*Director of the United States Patent and Trademark Office*